US010209764B2

(12) United States Patent
Levit-Gurevich et al.

(10) Patent No.: US 10,209,764 B2
(45) Date of Patent: Feb. 19, 2019

(54) APPARATUS AND METHOD FOR IMPROVING POWER-PERFORMANCE USING A SOFTWARE ANALYSIS ROUTINE

(71) Applicant: Intel Corporation, Santa Clara, CA (US)

(72) Inventors: Konstantin Levit-Gurevich, Kiryat Byalik (IL); Gadi Haber, Nesher (IL)

(73) Assignee: Intel Corporation, Santa Clara, CA (US)

(*) Notice: Subject to any disclaimer, the term of this patent is extended or adjusted under 35 U.S.C. 154(b) by 84 days.

(21) Appl. No.: 15/385,184

(22) Filed: Dec. 20, 2016

(65) Prior Publication Data
US 2018/0173291 A1   Jun. 21, 2018

(51) Int. Cl.
*G06F 1/32*       (2006.01)
*G06F 9/30*       (2018.01)
*G06F 9/38*       (2018.01)

(52) U.S. Cl.
CPC ............ *G06F 1/329* (2013.01); *G06F 1/3228* (2013.01); *G06F 9/30065* (2013.01); *G06F 9/3867* (2013.01)

(58) Field of Classification Search
CPC .... G06F 1/329; G06F 1/3228; G06F 9/30065; G06F 9/3867
See application file for complete search history.

(56) References Cited

U.S. PATENT DOCUMENTS

2002/0104075 A1*   8/2002   Bala .................... G06F 9/45504
                                                 717/136
2014/0281424 A1*   9/2014   Bobba .................. G06F 9/3005
                                                 712/225

* cited by examiner

*Primary Examiner* — Austin Hicks
(74) *Attorney, Agent, or Firm* — Nicholson De Vos Webster & Elliott, LLP

(57) ABSTRACT

Embodiments described herein relate to improving processor power-performance using a binary analyzer routine. In one example, a processor includes a memory interface to couple to a memory, at least one hardware accelerator circuit, and an execution pipeline including at least fetch, decode, and execute stages, wherein the processor, in response to a hot-spot hardware event indicating presence of a hot-spot sequence, is to switch context to a binary analyzer routine stored in the memory, the binary analyzer routine including instructions that, when fetched, decoded, and executed by the processor, cause the processor to analyze a region in the memory containing the hot-spot sequence, analyze hardware metrics relating to execution of the hot-spot sequence, and generate, based on the analyses, a recommendation for the at least one hardware accelerator circuit to improve at least one of power consumption and performance.

21 Claims, 23 Drawing Sheets

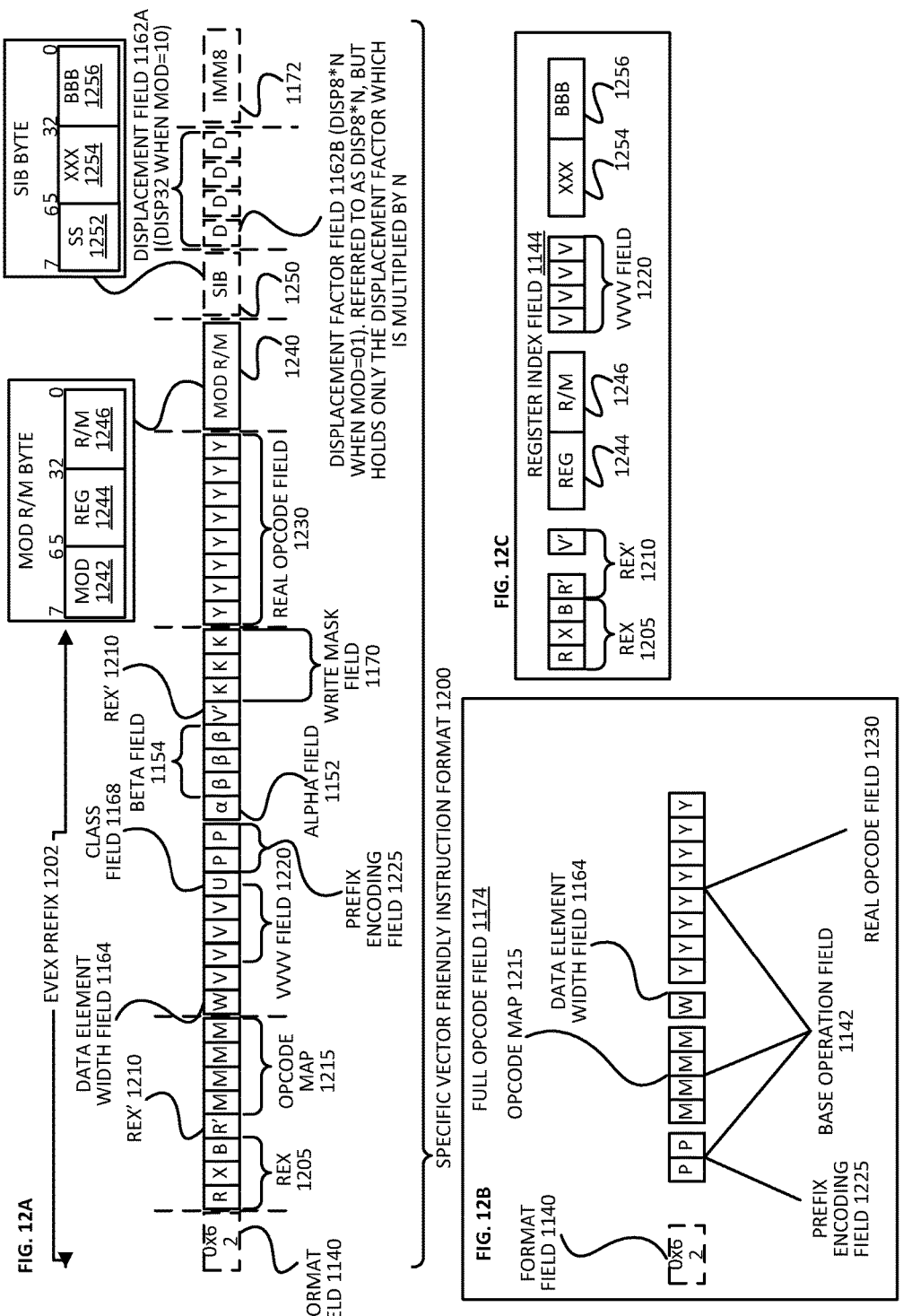

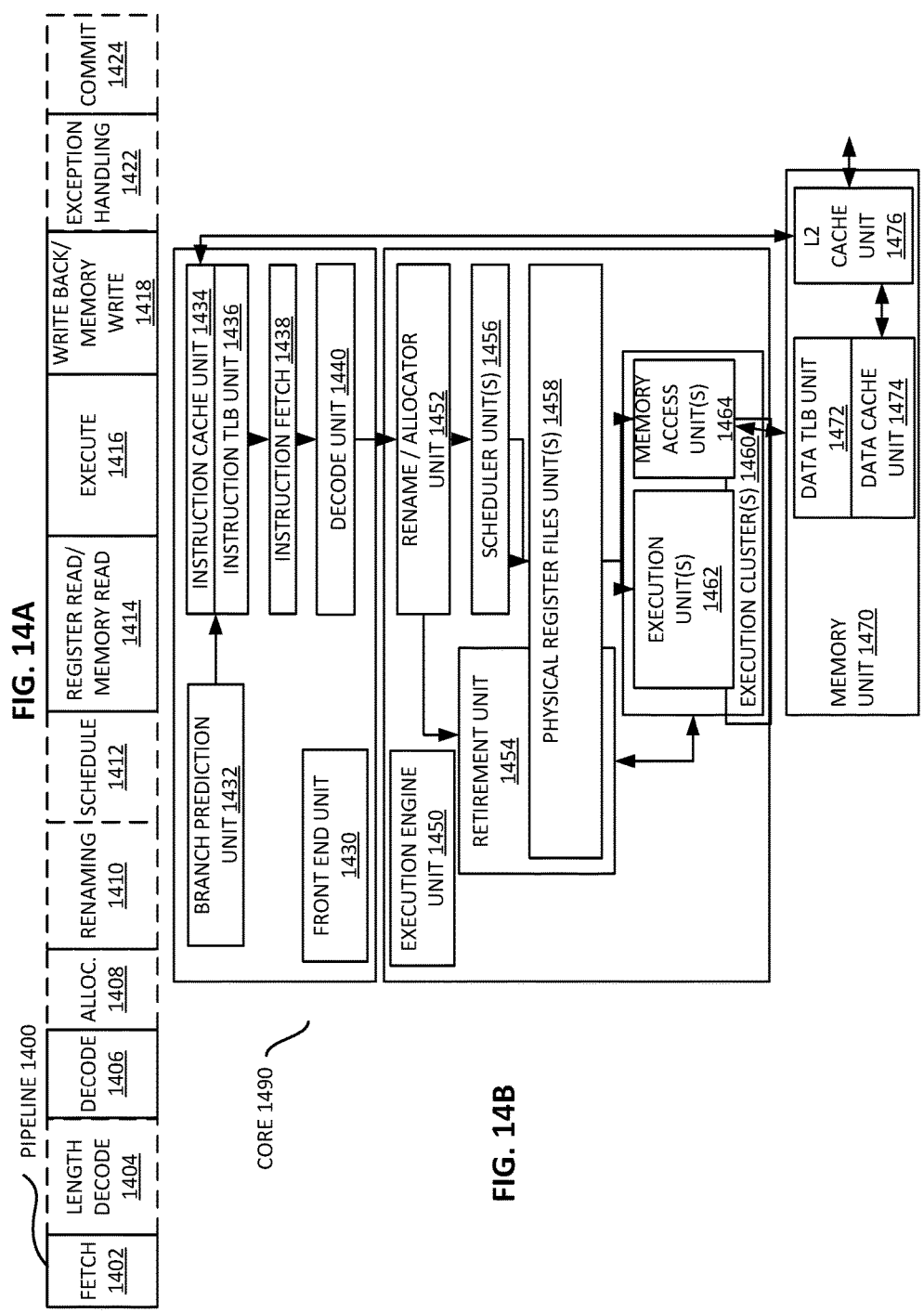

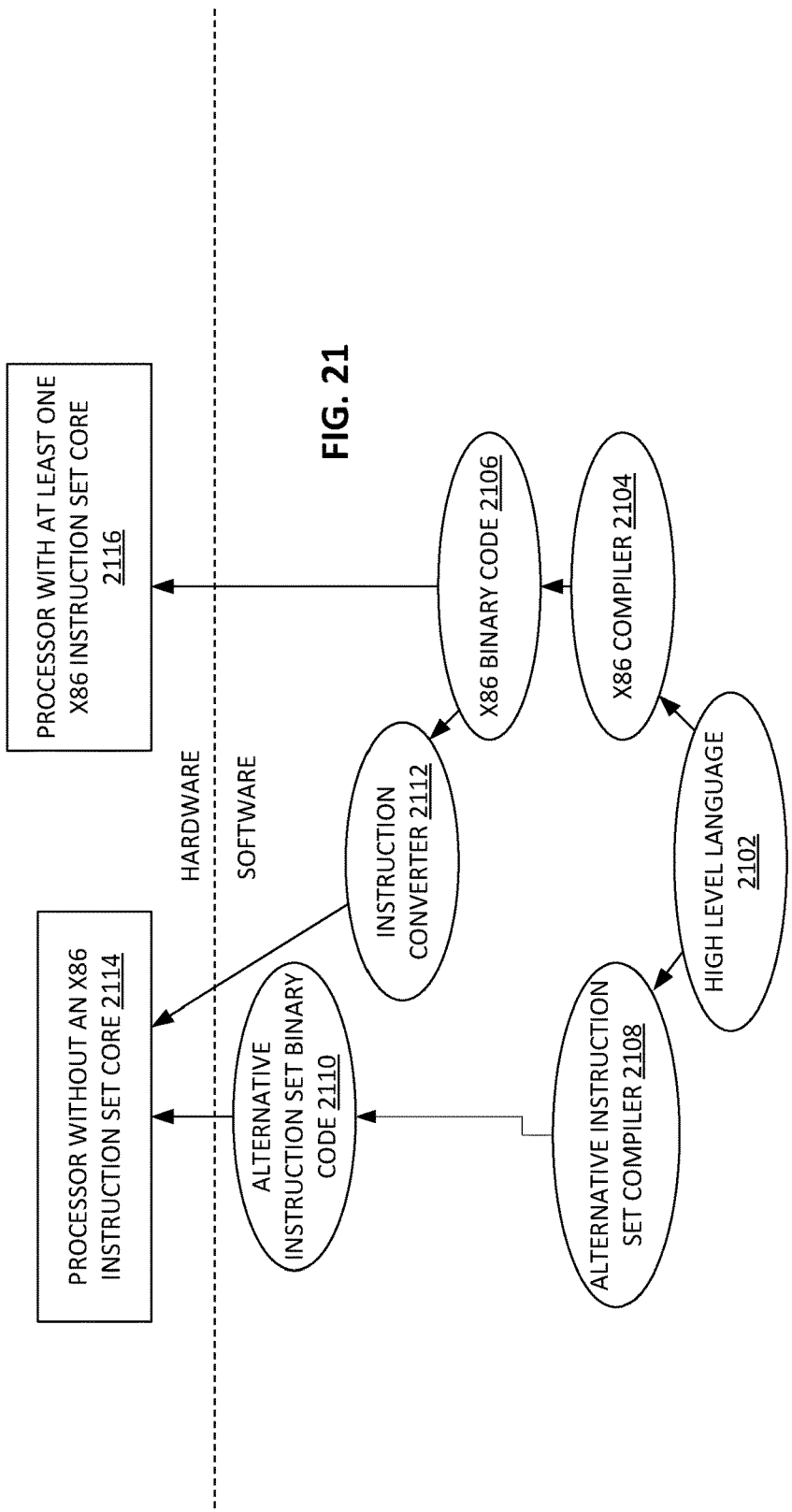

APPARATUS AND METHOD FOR IMPROVING POWER-PERFORMANCE USING A SOFTWARE ANALYSIS ROUTINE

TECHNICAL FIELD

Embodiments described herein generally relate to dynamic power and performance enhancements of processing apparatus. Embodiments described generally relate to apparatus and methods for improving processor power-performance using a binary analyzer routine.

BACKGROUND INFORMATION

Improving the power-performance of a central processing unit (CPU), for example by reducing a power consumption of the CPU or by increasing a throughput of the CPU, or decreasing a latency of the CPU, can be done by adding hardware accelerators and mechanisms that make use of characteristics of the specific workload. For example, workloads with highly predictable values and branches, out-of-order (OOO) execution for code with high number of independent instructions, speculation mechanisms (such as Transactional Memory), memory renaming, etc. Some of these accelerators/mechanisms work all of the time regardless of the workload nature, whereas others require explicit instruction from software—such as Restricted Transactional Memory (RTM) commands.

Applying all of the accelerators at all times causes high power consumption. At the same time, extending the accelerators to include characterization of the given workload increases their complexity. Relying on the software developer/compiler to directly operate the accelerators via explicit instructions may not be always worthwhile due to missing dynamic information of the compiler, backward compatibility with legacy code, and lack of microarchitecture knowledge during development of what are the complete optimization opportunities.

BRIEF DESCRIPTION OF THE DRAWINGS

The various advantages of the embodiments disclosed herein will become apparent to one skilled in the art by reading the following specification and appended claims, and by referencing the drawings, in which:

FIG. 11A is a block diagram illustrating a generic vector friendly instruction format and class A instruction templates thereof according to embodiments of the invention;

FIG. 11B is a block diagram illustrating the generic vector friendly instruction format and class B instruction templates thereof according to embodiments of the invention;

FIG. 12A is a block diagram illustrating an exemplary specific vector friendly instruction format according to embodiments of the invention;

FIG. 12B is a block diagram illustrating the fields of the specific vector friendly instruction format 1200 that make up the full opcode field 1174 according to one embodiment of the invention;

FIG. 12C is a block diagram illustrating the fields of the specific vector friendly instruction format 1200 that make up the register index field 1144 according to one embodiment of the invention;

FIG. 14A is a block diagram illustrating both an exemplary in-order pipeline and an exemplary register renaming, out-of-order issue/execution pipeline according to embodiments of the invention;

FIG. 14B is a block diagram illustrating both an exemplary embodiment of an in-order architecture core and an exemplary register renaming, out-of-order issue/execution architecture core to be included in a processor according to embodiments of the invention;

FIG. 15A is a block diagram of a single processor core, along with its connection to the on-die interconnect network 1502 and with its local subset of the Level 2 (L2) cache 1504, according to embodiments of the invention;

FIG. 15B is an expanded view of part of the processor core in FIG. 15A according to embodiments of the invention;

FIG. 17 shows a block diagram of a system in accordance with one embodiment of the present invention;

FIG. 18 is a block diagram of a first more specific exemplary system in accordance with an embodiment of the present invention;

FIG. 19 is a block diagram of a second more specific exemplary system in accordance with an embodiment of the present invention;

FIG. 20 is a block diagram of a System on a Chip (SoC) in accordance with an embodiment of the present invention; and FIG. 21 is a block diagram contrasting the use of a software instruction converter to convert binary instructions in a source instruction set to binary instructions in a target instruction set according to embodiments of the invention.

DETAILED DESCRIPTION OF THE EMBODIMENTS

Figure 1:
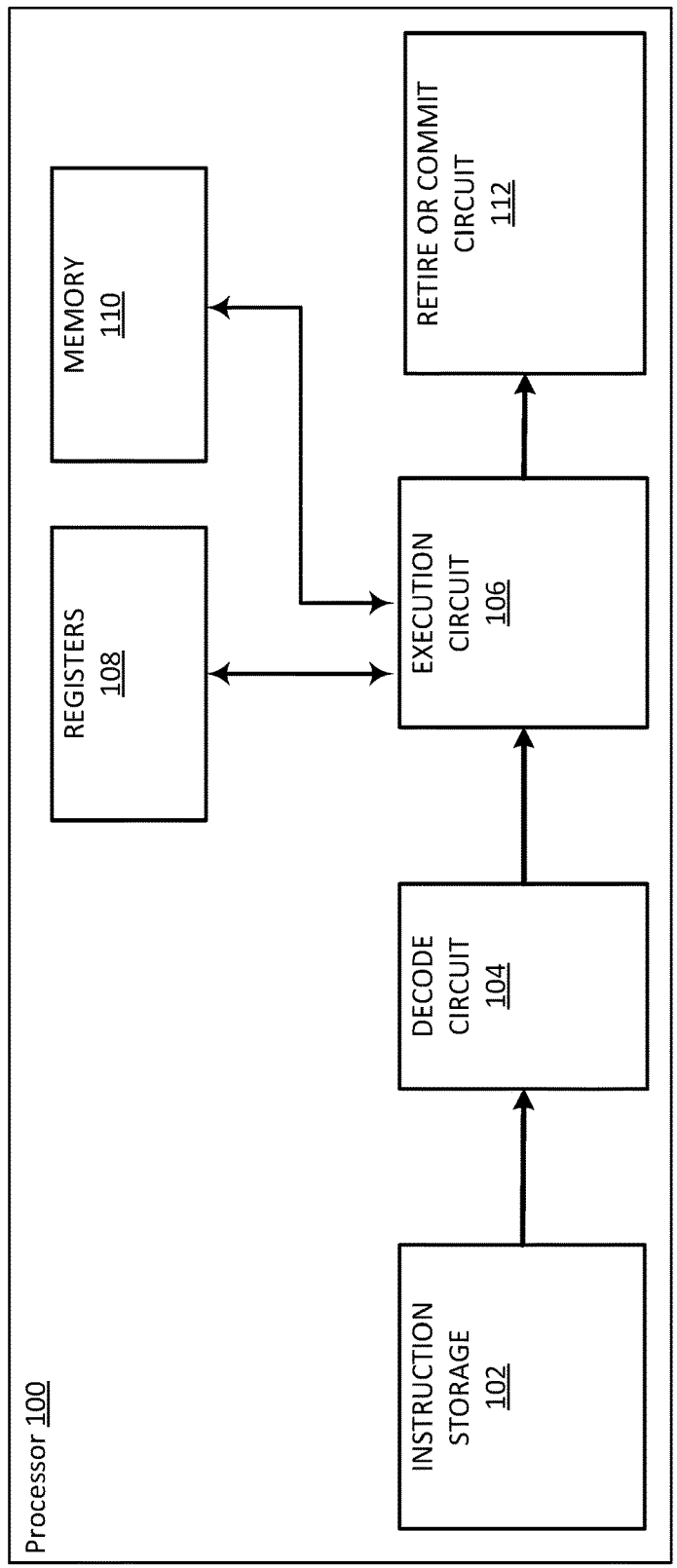
FIG. 1 is a block diagram of a system in which improving processor power-performance using a binary analyzer routine is implemented, according to some embodiments.

In the following description, numerous specific details are set forth. However, it is understood that embodiments of the disclosure are practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described includes a feature, structure, or characteristic, but every embodiment does not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments whether explicitly described.

Some of accelerators/mechanisms implemented in hardware to enhance power-performance work all the time regardless of the workload nature. Because they are working all the time, these consume a lot of power. Extending such accelerators to include characterization of a given workload increases their complexity. Some hardware-based accelerators thus exhibit excessive complexity and power consumption.

Furthermore, hardware (HW) accelerator mechanisms rely on HW-only design, thus making them more complex and more power consuming—mainly due to the fact that HW is not well suited to perform code analysis the way software (SW) does. This is because the HW can see a limited window of instructions, and identifying dependencies between instructions requires complicated design (for example out-of-order implementation). Embodiments disclosed herein, on the other hand, perform the analysis of the binary code by applying a software algorithm, which is more comprehensive and scalable, and independent of HW complexity.

Moreover, embodiments disclosed herein perform this analysis only once for each given piece of hot-code, and eliminates the need to continuously re-apply the logics (as done in the case of HW only solution) and thus saves power.

Some accelerators/mechanisms require explicit instructions from software, for example Restricted Transactional Memory (RTM) instructions embedded in the instruction stream. But relying on the SW developer/compiler to directly operate the accelerators via explicit instructions may not be always worthwhile due to, for example, missing dynamic information of the compiler, backward compatibility with legacy code, and lack of microarchitecture knowledge of what are the complete optimization opportunities.

Embodiments disclosed herein address the above issues by using dynamic, software-based binary analysis. Binary Analysis (BA) can be applied by the CPU (or a separate low-power coprocessor) on the high frequently executed code only. BA has the ability to analyze a given portion of code, characterize it, identify the combination of the relevant accelerators/mechanisms that can impact the performance, and configure them to operate on the specific code portion.

Embodiments disclosed herein use dynamic SW-based binary analysis for a given running workload, in order to reduce the complexity and the power consumption of HW-based accelerators. A binary analysis algorithm can be triggered by a simple HW event that occurs when a hot-spot detector of a processor detects a hot-code sequence (for example, after reaching a threshold on the number of execution counts of an instruction or sequence of instructions during runtime). Consequently, the hot-spot detector is to gather hardware metrics and generate a hot-spot hardware event to trigger the BA. Once triggered, the BA analyzes the hardware metrics and the code surrounding the triggering instruction to determine information about control and data dependencies, predictability live-ness of registers, etc. Retrieving this information by hardware-only requires complicated design. Once the analysis is completed, the Binary Analyzer can apply the relevant accelerator(s) that can most benefit from the given code. The analysis need not be repeated again on the same code. In some embodiments, the Binary Analyzer is to store the recommendation in its data segment for future use and for future occurrences of the hot-spot sequence.

Embodiments disclosed herein avoid the complexity and hardware-cost of doing binary translation (generating new code). Rather, embodiments disclosed herein reduce logic complexity and power consumption of HW accelerators by applying the BA algorithm to program the different combinations of available HW accelerators to operate on specific addresses of the native code. This way, the cost of the HW support for the binary translation is eliminated, as well as the overhead and complexity of creating the translations and their management, since the BA need only be conducted once for a region of code.

As used herein, the term "native code" is used to refer to computer code that is compiled to run with a processor and to use the set of instructions provided by the instruction set architecture of that processor. If the same program is run on a computer with a different processor, software can be provided so that the computer emulates the original processor. Alternatively, the same program can be recompiled to use the instruction set architecture of a different processor. Relatedly, the term "native execution mode" is used herein to refer to executing native code.

FIG. 1 is a block diagram of a system in which improving processor power-performance using a binary analyzer routine is implemented, according to some embodiments. As shown, processor 100 includes instruction storage 102, decode circuit 104, execution circuit 106, registers 108, memory 110, and retire or commit circuit 112. In operation, an instruction is input from instruction storage 102, which comprises a cache memory, an on-chip memory, a memory on the same die as the processor, an instruction register, a general register, or system memory, without limitation. Decode circuit 104 decodes the instruction. In one embodiment, the instruction comprises fields discussed further below, at least with respect to FIGS. 11A-B, and 12A-C. The decoded instruction is executed by execution circuit 106. Execution circuit 106 is configured to read data from and write data to registers 108 and memory 110. Registers 108 comprise any one or more of a data register, an instruction register, a general register, and an on-chip memory. An embodiment of a register file is discussed below, at least with respect to FIG. 13. Memory 110 comprises any one or more of an on-chip memory, a memory on the same die as the processor, a memory in the same package as the processor, a cache memory, and system memory. Several exemplary embodiments of execution circuit 106 are described and illustrated with respect to figures, below. Retire or commit circuit 112 ensures that execution results are written to or have been written to their destinations, and frees up or releases resources for later use.

Figure 2:
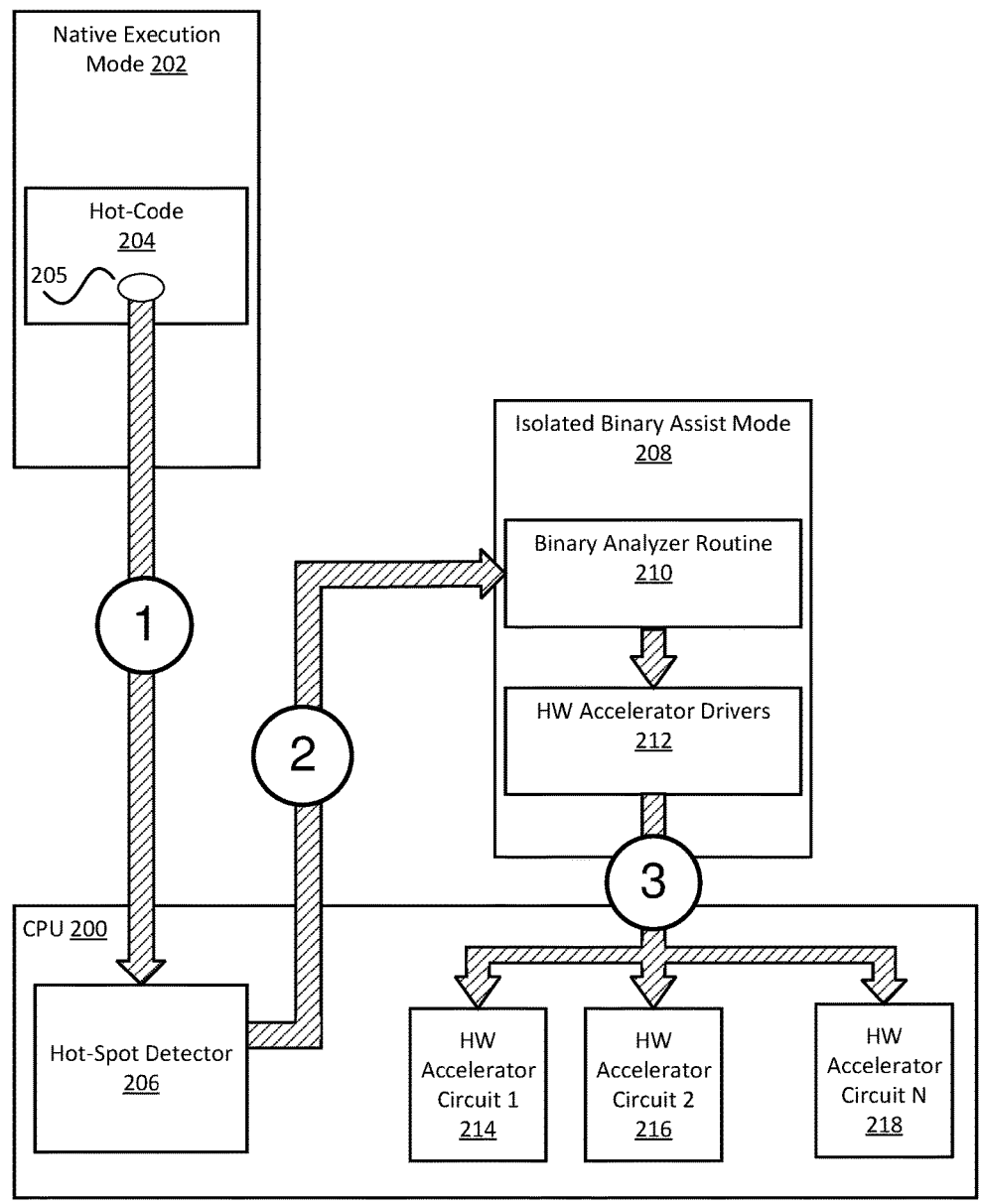
FIG. 2 is an architectural flow diagram of improving processor power-performance using a binary analyzer routine, according to some embodiments.

FIG. 2 is an architectural flow diagram of improving processor power-performance using a binary analyzer routine, according to some embodiments. As shown, CPU 200 includes hot-spot detector 206, as well as HW accelerator circuit 1 214, HW accelerator circuit 2 216, and HW accelerator circuit N 218. Also shown are two ranges within a memory: a first region, native execution mode 202, includes code to be executed by CPU 200, including hot-code 204. A second region, isolated binary assist mode 208, includes binary analyzer routine 210 and HW accelerator drivers 212.

In operation, CPU 200 is to fetch instructions from memory, decode the fetched instructions, and execute the decoded instructions. While CPU 200 fetches, decodes, and executes instructions, hot-spot detector 206 is to monitor the circuitry executing the instructions. As illustrated by the arrow labeled as "1," hot-spot detector 206 is to detect a hot-spot sequence comprising at least one of a loop instruction, a branch instruction, a memory access to at least one of a loop index, a loop constant, and a loop invariant, and an instruction repeated at least a threshold number of times. As shown, the hot-spot sequence is detected while executing an instruction 205 that is part of hot-code 204.

In some embodiments, the hot-spot detector maintains a count of a number of times that an instruction at a particular linear instruction address has repeated. When the number meets, or exceeds a threshold, which can be set to any integer value, the hot-spot detector 206 treats that instruction as part of a hot-spot sequence. In some embodiments, the threshold is in a protected memory region and is not accessible by software. In other embodiments, the threshold is stored in a model-specific register (MSR) that can be accessed and programmed by software.

Upon detecting the hot-spot sequence, hot-spot detector 206 is to gather hardware metrics relating to execution of the hot-spot sequence and to generate a hot-spot hardware event. Examples of hardware metrics that are to be gathered include, but are not limited to, cache hit/miss behavior, branch mispredictions, loop behavior, variance of values accessed from memory, occurrences of array-walking algorithms that step through an array by a fixed stride, stalls, and branch taken-not-taken statistics and probabilities. In response to the hot-spot hardware event, the processor is to switch context to a binary analyzer routine. In some embodiments, the processor provides a task management mechanism that is used to switch tasks. As illustrated by the arrow labeled as "2," the processor is to switch context to isolated binary assist mode 208. In some embodiments, a binary assist routine is stored in a protected memory region, for example, as described with respect to FIG. 5.

At 210, the binary analyzer routine is to analyze the hardware metrics relating to execution of the hot-spot sequence. The binary analyzer routine in some embodiments analyzes a code region in memory around the hot-spot instruction instead of or in addition to analyzing the hardware metrics. In some embodiments, the binary analyzer routine analyzes code that was executed long before the hot-spot instruction. In other embodiments, the binary analyzer routine analyzes code that is to be executed long after the hot-spot instruction. As compared to hardware optimization techniques that rely on hardware circuitry, embodiments disclosed herein have an advantage that they have the ability to analyze code stored in the memory, including code that came long before the hot-spot code and code that is to come long after the hot-spot code.

At 210, the binary analyzer routine, based on its analysis of the hardware metrics and/or the code region, is to generate a recommendation to improve at least one of power consumption and performance of the processor. In the illustrated embodiment, the recommendation is to be delivered to hardware accelerator drivers 212, which in turn are to forward the recommendation, by way of an arrow labeled as "3," to HW accelerator 1 214, HW accelerator 2 216, and/or HW accelerator circuit N 218. In other embodiments, the recommendation is stored in a recommendation queue (not shown), which is to be monitored by the hardware accelerator circuits 1-N.

Figure 3:
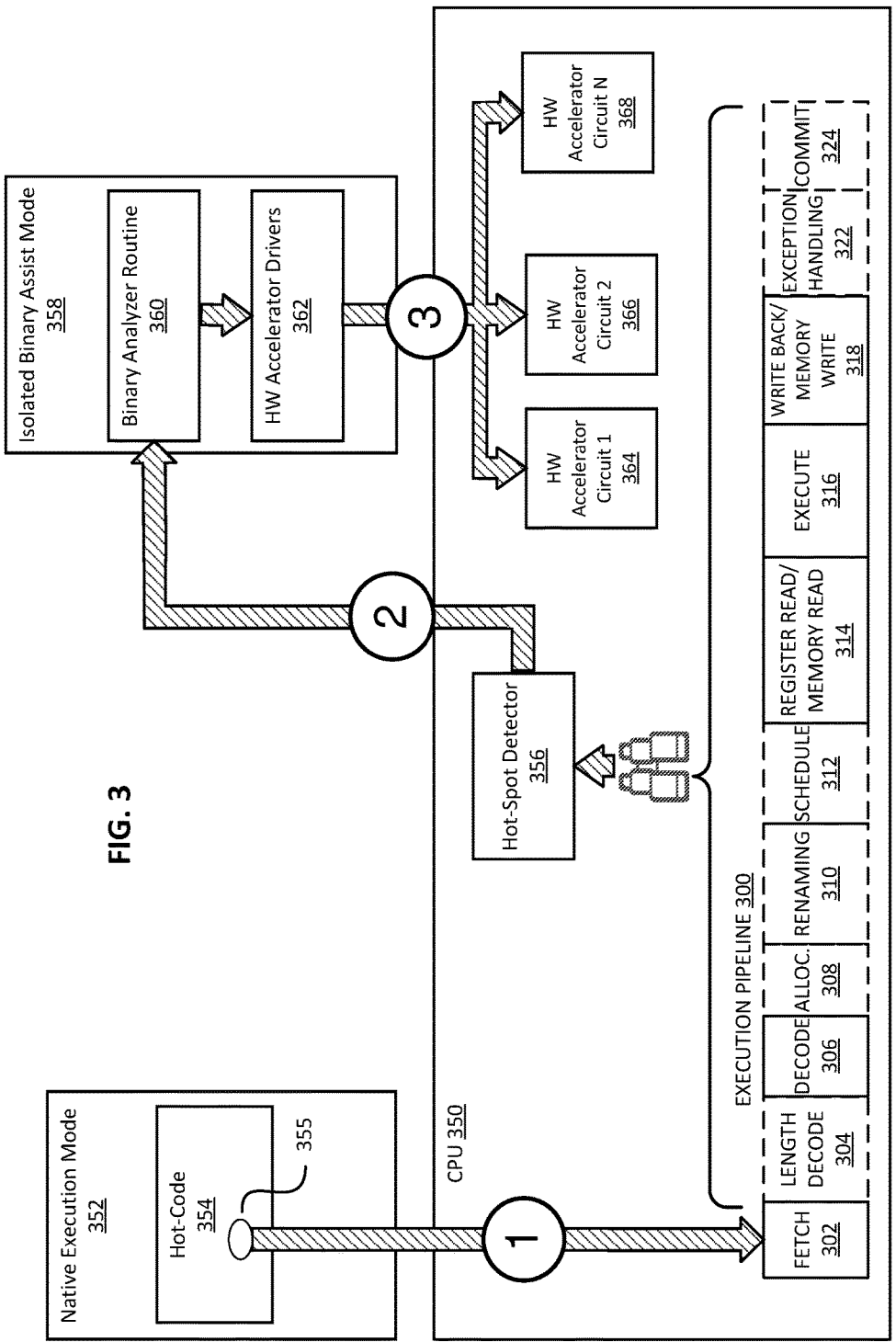
FIG. 3 is an architectural flow diagram of improving processor power-performance using a binary analyzer routine, according to some embodiments.

FIG. 3 is an architectural flow diagram of improving processor power-performance using a binary analyzer routine, according to some embodiments. As shown, CPU 350 includes hot-spot detector 356, as well as HW accelerator circuit 1 364, HW accelerator circuit 2 366, and HW accelerator circuit N 368. Also shown are two ranges within a memory: a first region, native execution mode 352, includes code to be executed by CPU 350, including hot-code 354. A second region, isolated binary assist mode 358, includes binary analyzer routine 360 and HW accelerator drivers 362.

CPU 350 also includes execution pipeline 300, which includes a fetch 302 stage, a length decode 304 stage, a decode 306 stage, an allocation 308 stage, a renaming 310 stage, a schedule 312 stage (also known as a dispatch or issue stage), a register read/memory read 314 stage, an execute 316 stage, a write back/memory write 318 stage, an exception handling 322 stage, and a commit 324 stage.

In operation, CPU 350 is to fetch instructions from memory, decode the fetched instructions, and execute the decoded instructions. While CPU 350 fetches, decodes, and executes instructions, hot-spot detector 356 is to monitor the circuitry executing the instructions. As illustrated by the arrow labeled as "1," hot-spot detector 356 is to detect a hot-spot sequence comprising at least one of a loop instruction, a branch instruction, and an instruction repeated at least a threshold number of times. As shown, the hot-spot sequence is detected while executing an instruction 355 that is part of hot-code 354.

Upon detecting the hot-spot sequence, hot-spot detector 356 is to gather hardware metrics relating to execution of the hot-spot sequence and to generate a hot-spot hardware event. In response to the hot-spot hardware event, the processor is to switch context to a binary analyzer routine. In some embodiments, the processor provides a task management mechanism that is used to switch tasks. As illustrated by the arrow labeled as "2," the processor is to switch context to isolated binary assist mode 358. In some embodiments, a binary assist routine is stored in a protected memory region, for example, as described with respect to FIG. 5.

At 360, the binary analyzer routine is to analyze the hardware metrics relating to execution of the hot-spot sequence. The binary analyzer routine in some embodiments also is to analyze a code region in memory around the hot-spot instruction. In some embodiments, the binary analyzer routine analyzes code that was executed long before the hot-spot instruction. In other embodiments, the binary analyzer routine analyzes code that is to be executed long after the hot-spot instruction. As compared to hardware optimization techniques that rely on hardware circuitry, embodiments disclosed herein have an advantage that they have the ability to analyze code stored in the memory, including code that came long before the hot-spot code and code that is to come long after the hot-spot code.

At 360, the binary analyzer routine, based on its analysis of the hardware metrics and/or the code region, is to generate a recommendation to improve the power-performance of the processor. In the illustrated embodiment, the recommendation is to be delivered to HW accelerator drivers at 362, which in turn is to forward the recommendation, by way of an arrow labeled as "3," to HW accelerator 1 364, HW accelerator 2 366, and/or HW accelerator circuit N 368. In other embodiments, the recommendation is stored in a recommendation queue (not shown), which is to be monitored by the hardware accelerator circuits 1-N.

Figure 4:
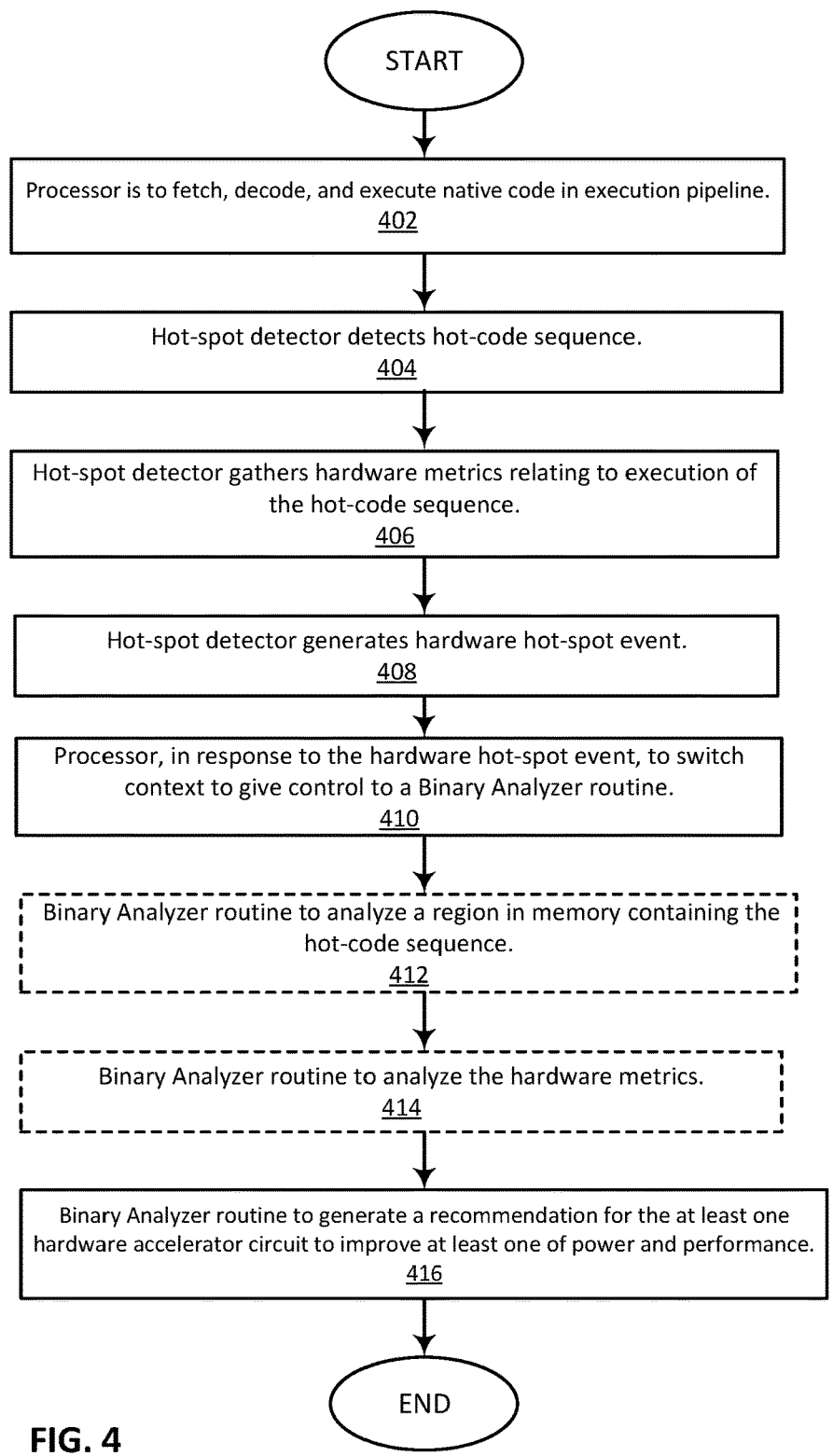
FIG. 4 is a flow diagram of a process executed by a processor using a binary analyzer routine to improve power-performance, according to some embodiments.

FIG. 4 is a flow diagram of a process executed by a processor using a binary analyzer routine to improve power-performance, according to some embodiments. After starting, at 402 a processor is to fetch, decode, and execute native code in an execution pipeline. At 404, a hot-spot detector is to detect a hot-code sequence. At 406, the hot-spot detector is to gather hardware metrics relating to execution of the hot-code sequence. At 408, the hot-spot detector is to generate a hardware hot-spot event. At 410, the processor, in response to the hardware hot-spot event, is to switch context to give control to a binary analyzer routine. At 412, the binary analyzer routine is to analyze a region in memory containing the hot-code sequence. Dashed lines are used for 412 to indicate that it is optional to analyze memory contents; binary analyzer routine may generate recommendations without analyzing the memory. At 414, the binary analyzer routine is to analyze the hardware metrics. Dashed lines are used for 414 to indicate that it is optional to analyze hardware metrics. At 416, based on the analysis, the binary analyzer routine is to generate a recommendation for the at least one hardware accelerator circuit to improve at least one of power and performance. As compared to hardware optimization techniques that rely on hardware circuitry, embodiments disclosed herein have an advantage that they have the ability to analyze code stored in the memory, including code that came long before the hot-spot code and code that is to come long after the hot-spot code.

In some embodiments, binary analyzer is triggered at 410 by a hardware counter reaching a predetermined threshold, and then the process continues to 414, 416, and so on. In some embodiments, binary analyzer is triggered at 410 by a hardware counter reaching a predetermined threshold, and the process continues to 414, 416, and so on.

Figure 5:
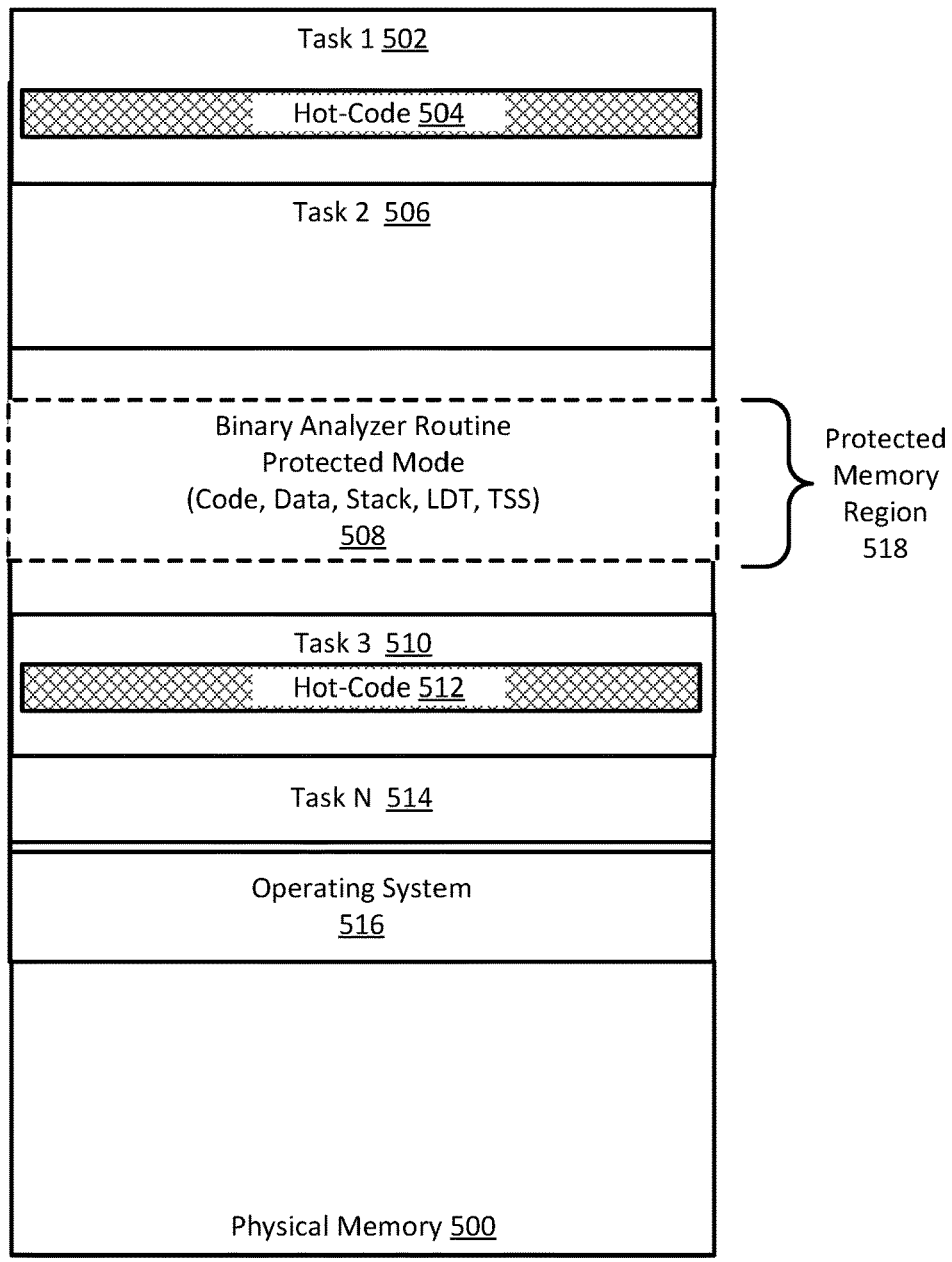
FIG. 5 is a map of physical memory including a binary analyzer routine in a protected memory region, according to some embodiments.

FIG. 5 is a map of physical memory including a binary analyzer routine in a protected memory region, according to some embodiments. In some embodiments, the processor provides a memory protection mechanism, including protected memory regions. As shown, physical memory 500 includes binary analyzer routine 508, which is in a protected memory region 518. In some embodiments, the processor provides software-accessible model-specific registers that can be programmed to define a protected memory region. In some embodiments, the binary analyzer routine is to be executed in a protected mode of the processor. In some embodiments, the binary analyzer routine is similar to other tasks in the processor, and includes a code segment, a data segment, a stack segment, and a global and/or local descriptor tables (GDT/LDT), and an interrupt descriptor table (IDT). In some embodiments, binary analyzer routine also includes a task state segment (TSS), which includes the base addresses of the task segments, as well as contextual state information that is stored and subsequently reloaded to enable the code analysis routine to be switched in and out of context.

Physical memory 500 also includes several other regions: task 1 502, which includes hot-code 504, task 2 506, task 3 510, which includes hot-code 512, task N 514, and operating system 516.

Figure 6:
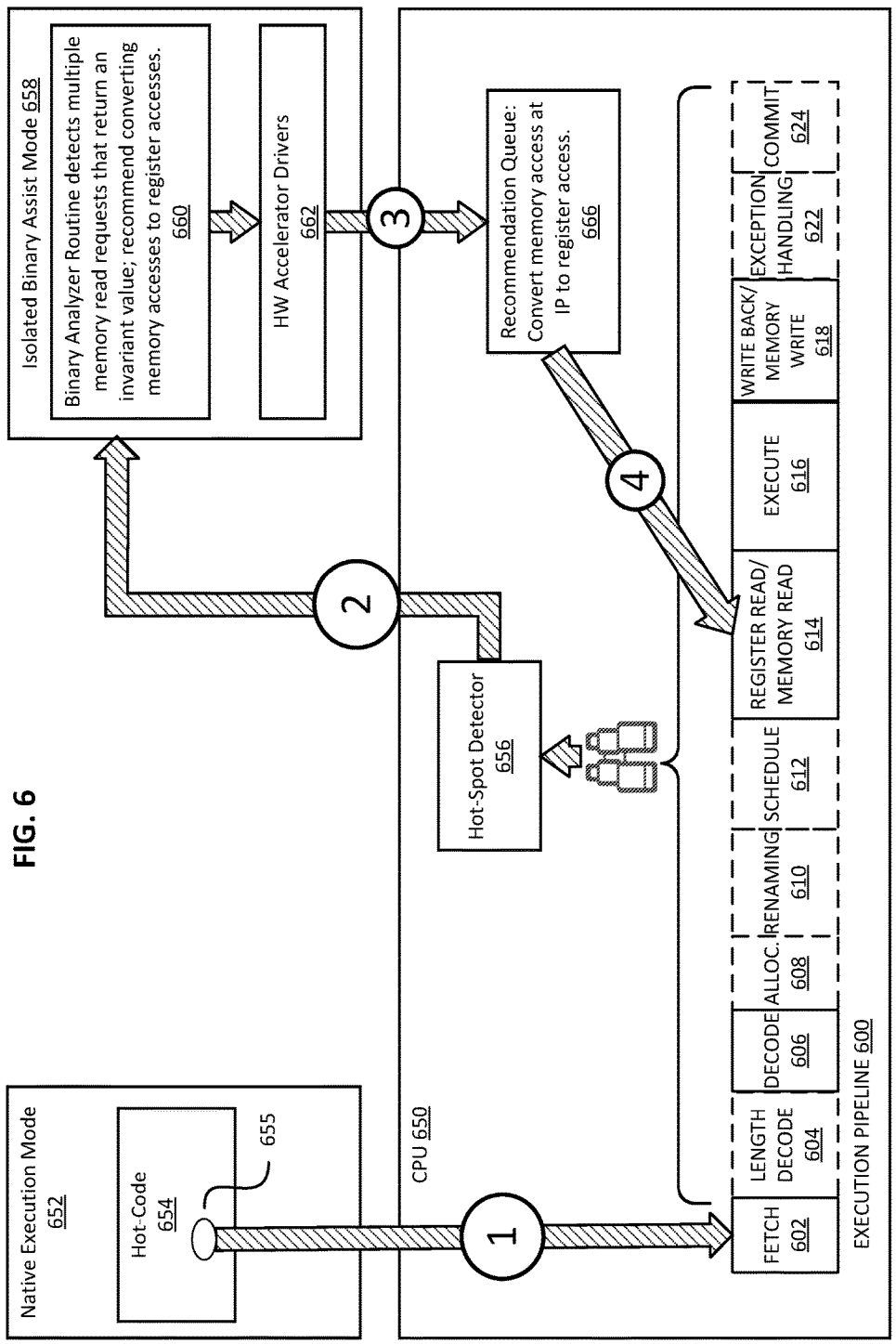
FIG. 6 is an architectural flow diagram of improving processor power-performance using a binary analyzer routine, according to some embodiments.

FIG. 6 is an architectural flow diagram of improving processor power-performance using a binary analyzer routine, according to some embodiments. As shown, CPU 650 includes hot-spot detector 656.

Also shown are two ranges within a memory: a first region, native execution mode 652, includes code to be executed by CPU 650, including hot-code 654. A second region, isolated binary assist mode 658, includes binary analyzer routine 660 and HW accelerator drivers 662.

CPU 650 also includes execution pipeline 600, which includes a fetch 602 stage, a length decode 604 stage, a decode 606 stage, an allocation 608 stage, a renaming 610 stage, a schedule 612 stage (also known as a dispatch or issue stage), a register read/memory read 614 stage, an execute 616 stage, a write back/memory write 618 stage, an exception handling 622 stage, and a commit 624 stage.

In operation, CPU 650 is to fetch instructions from memory at the fetch 602 stage (illustrated by the arrow labeled as "1"), decode the fetched instructions at decode 606 stage, and execute the decoded instructions at execute 616 stage of the pipeline. While CPU 650 fetches, decodes, and executes instructions, hot-spot detector 656 is to monitor execution pipeline 600. In FIG. 6, binoculars are used to indicate that hot-spot detector 656 is to monitor execution pipeline 600. Hot-spot detector 656 is to detect a hot-spot sequence comprising at least one of a loop instruction, a branch instruction, and an instruction repeated at least a threshold number of times. As shown, the hot-spot sequence is detected while executing an instruction 655 that is part of hot-code 654.

Upon detecting the hot-spot sequence, hot-spot detector 656 is to gather hardware metrics relating to execution of the hot-spot sequence and to generate a hot-spot hardware event. In response to the hot-spot hardware event, the processor is to switch context to a binary analyzer routine. In some embodiments, the processor provides a task management mechanism that is used to switch tasks. As illustrated by the arrow labeled as "2," the processor is to switch context to isolated binary assist mode 658. In some embodiments, a binary assist routine is stored in a protected memory region, for example, as described with respect to FIG. 5.

At 660, the binary analyzer routine is to analyze the hardware metrics relating to execution of the hot-spot sequence. The binary analyzer routine in some embodiments also is to analyze a code region in memory around the hot-spot instruction. In some embodiments, the binary analyzer routine analyzes code that was executed long before the hot-spot instruction. In other embodiments, the binary analyzer routine analyzes code that is to be executed long after the hot-spot instruction. As compared to hardware optimization techniques that rely on hardware circuitry, embodiments disclosed herein have an advantage that they have the ability to analyze code stored in the memory, including code that came long before the hot-spot code and code that is to come long after the hot-spot code.

At 660, the binary analyzer routine detects that multiple memory read requests return the same, invariant value. The binary analyzer routine therefore at 660 generates a recommendation to convert memory read requests into register read requests. In the illustrated embodiment, the recommendation at 662 is to be delivered to hardware accelerator drivers, which in turn at 666 are to store the recommendation into a recommendation queue, by way of an arrow labeled as "3." Register read/memory read 614 pipeline stage is to periodically check the recommendation queue and retrieve recommendations directed to it, by way of an arrow labeled as "4." In other embodiments, at 662, the hardware accelerator drivers are to forward the recommendation to the register read/memory read 614 stage of the pipeline. In response to the recommendation, register read/memory read 614 stage of the pipeline is to convert corresponding memory reads to register reads.

Figure 7:
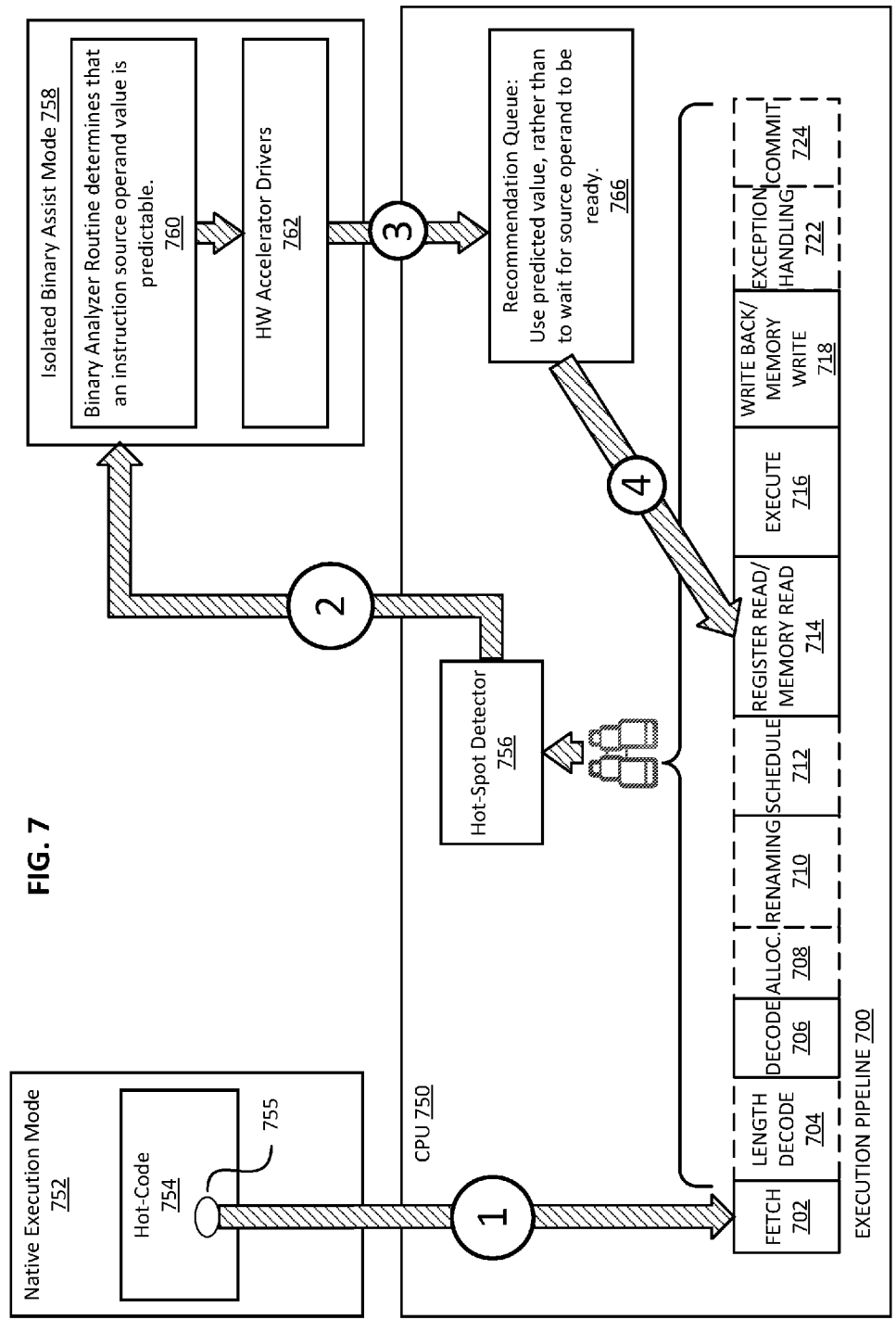
FIG. 7 is an architectural flow diagram of improving processor power-performance using a binary analyzer routine, according to some embodiments.

FIG. 7 is an architectural flow diagram of improving processor power-performance using a binary analyzer routine, according to some embodiments. As shown, CPU 750 includes hot-spot detector 756.

Also shown are two ranges within a memory: a first region, native execution mode 752, includes code to be executed by CPU 750, including hot-code 754. A second region, isolated binary assist mode 758 includes binary analyzer routine 760 and HW accelerator drivers 762.

CPU 750 also includes execution pipeline 700, which includes a fetch 702 stage, a length decode 704 stage, a decode 706 stage, an allocation 708 stage, a renaming 710 stage, a schedule 712 stage (also known as a dispatch or issue stage), a register read/memory read 714 stage, an execute 716 stage, a write back/memory write 718 stage, an exception handling 722 stage, and a commit 724 stage.

In operation, CPU 750 is to fetch instructions from memory at the fetch 702 stage (illustrated by the arrow labeled as "1"), decode the fetched instructions at decode 706 stage, and execute the decoded instructions at execute 716 stage of the pipeline. While CPU 750 fetches, decodes, and executes instructions, hot-spot detector 756 is to monitor execution pipeline 700. In FIG. 7, binoculars are used to indicate that hot-spot detector 756 is to monitor execution pipeline 700. Hot-spot detector 756 is to detect a hot-spot sequence comprising at least one of a loop instruction, a branch instruction, and an instruction repeated at least a threshold number of times. As shown, the hot-spot sequence is detected while executing an instruction 755 that is part of hot-code 754.

Upon detecting the hot-spot sequence, hot-spot detector 756 is to gather hardware metrics relating to execution of the hot-spot sequence and to generate a hot-spot hardware event. In response to the hot-spot hardware event, the processor is to switch context to a binary analyzer routine. In some embodiments, the processor provides a task management mechanism that is used to switch tasks. As illustrated by the arrow labeled as "2," the processor is to switch context to isolated binary assist mode 758. In some embodiments, a binary assist routine is stored in a protected memory region, for example, as described with respect to FIG. 5.

At 760, the binary analyzer routine is to analyze the hardware metrics relating to execution of the hot-spot sequence. The binary analyzer routine in some embodiments also is to analyze a code region in memory around the hot-spot instruction. In some embodiments, the binary analyzer routine analyzes code that was executed long before the hot-spot instruction. In other embodiments, the binary analyzer routine analyzes code that is to be executed long after the hot-spot instruction. As compared to hardware optimization techniques that rely on hardware circuitry, embodiments disclosed herein have an advantage that they have the ability to analyze code stored in the memory, including code that came long before the hot-spot code and code that is to come long after the hot-spot code.

At 760, the binary analyzer routine is to determine that an instruction source operand value is predictable. For example, when an instruction is to increment or decrement a loop index, the value is predictable. As another example, when an instruction is to update an array pointer by a constant value (or stride), that value is predictable. The binary analyzer routine therefore at 760 is to generate a recommendation to use a predicted value. The binary analyzer in some embodiments can avoid waiting for the source operand to be calculated and ready. In the illustrated embodiment, the recommendation at 762 is to be delivered to hardware accelerator drivers, which in turn at 766 are to store the recommendation into a recommendation queue, by way of the arrow labeled as "3." In turn, register read/memory read 714 pipeline stage is to periodically check the recommendation queue and retrieve recommendations directed to it, which in FIG. 7 is indicated by the arrow labeled as "4." In other embodiments, at 762, the hardware accelerator drivers are to forward the recommendation to the register read/memory read 714 stage of the pipeline. In response to the recommendation, register read/memory read 714 stage of the pipeline is to convert corresponding memory reads to register reads.

Figure 8:
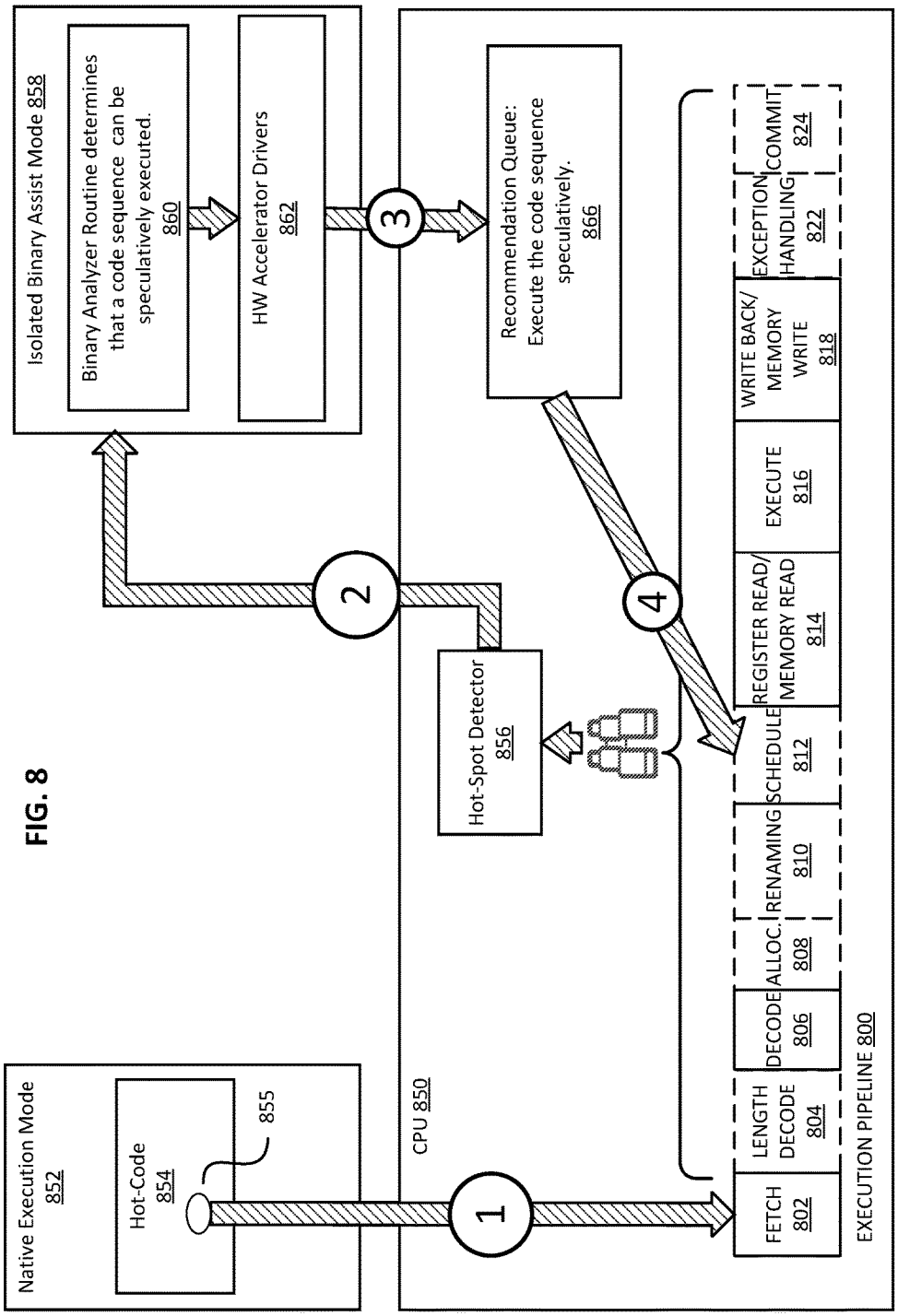
FIG. 8 is an architectural flow diagram of improving processor power-performance using a binary analyzer routine, according to some embodiments.

FIG. 8 is an architectural flow diagram of improving processor power-performance using a binary analyzer routine, according to some embodiments. As shown, CPU 850 includes hot-spot detector 856.

Also shown are two ranges within a memory: a first region, native execution mode 852, includes code to be executed by CPU 850, including hot-code 854. A second region, isolated binary assist mode 858 includes binary analyzer routine 860 and HW accelerator drivers 862.

CPU 850 also includes execution pipeline 800, which includes a fetch 802 stage, a length decode 804 stage, a decode 806 stage, an allocation 808 stage, a renaming 810 stage, a schedule 812 stage (also known as a dispatch or issue stage), a register read/memory read 814 stage, an execute 816 stage, a write back/memory write 818 stage, an exception handling 822 stage, and a commit 824 stage.

In operation, CPU 850 is to fetch instructions from memory at the fetch 802 stage (illustrated by the arrow labeled as "1"), decode the fetched instructions at decode 806 stage, and execute the decoded instructions at execute 816 stage of the pipeline. While CPU 850 fetches, decodes, and executes instructions, hot-spot detector 856 is to monitor execution pipeline 800. In FIG. 8, binoculars are used to indicate that hot-spot detector 856 is to monitor execution pipeline 800. Hot-spot detector 856 is to detect a hot-spot sequence comprising at least one of a loop instruction, a branch instruction, and an instruction repeated at least a threshold number of times. As shown, the hot-spot sequence is detected while executing an instruction 855 that is part of hot-code 854.

Upon detecting the hot-spot sequence, hot-spot detector 856 is to gather hardware metrics relating to execution of the hot-spot sequence and to generate a hot-spot hardware event. In response to the hot-spot hardware event, the processor is to switch context to a binary analyzer routine. In some embodiments, the processor provides a task management mechanism that is used to switch tasks. As illustrated by the arrow labeled as "2," the processor is to switch context to isolated binary assist mode 858. In some embodiments, a binary assist routine is stored in a protected memory region, for example, as described with respect to FIG. 5.

At 860, the binary analyzer routine is to analyze the hardware metrics relating to execution of the hot-spot sequence. The binary analyzer routine in some embodiments also is to analyze a code region in memory around the hot-spot instruction. In some embodiments, the binary analyzer routine analyzes code that was executed long before the hot-spot instruction. In other embodiments, the binary analyzer routine analyzes code that is to be executed long after the hot-spot instruction. As compared to hardware optimization techniques that rely on hardware circuitry, embodiments disclosed herein have an advantage that they have the ability to analyze code stored in the memory, including code that came long before the hot-spot code and code that is to come long after the hot-spot code.

At 860, the binary analyzer routine is to determine that a code sequence can be speculatively executed. For example, based on its analysis, the binary analyzer routine in some embodiments can recommend that the processor begin speculatively executing code at a certain starting point linear instruction address, and to commit/retire the execution at a subsequent endpoint linear instruction address. Such an embodiment provides an advantage of identifying and executing code sections speculatively without requiring a compiler to be involved in identifying speculative code sections. The binary analyzer routine therefore at 860 is to generate a recommendation to execute code speculatively.

In the illustrated embodiment, the recommendation at 862 is to be delivered to hardware accelerator drivers, which in turn at 866 are to store the recommendation into a recommendation queue, by way of the arrow labeled as "3." Register read/memory read 814 pipeline stage is to periodically check the recommendation queue and retrieve recommendations directed to it, which in FIG. 8 is indicated by the arrow labeled as "4." In other embodiments, at 862, the hardware accelerator drivers are to forward the recommendation to the register read/memory read 814 stage of the pipeline. In response to the recommendation, in some embodiments, schedule 812 stage of the pipeline is to schedule the instruction to be executed speculatively, and committed after reaching the endpoint.

Figure 9:
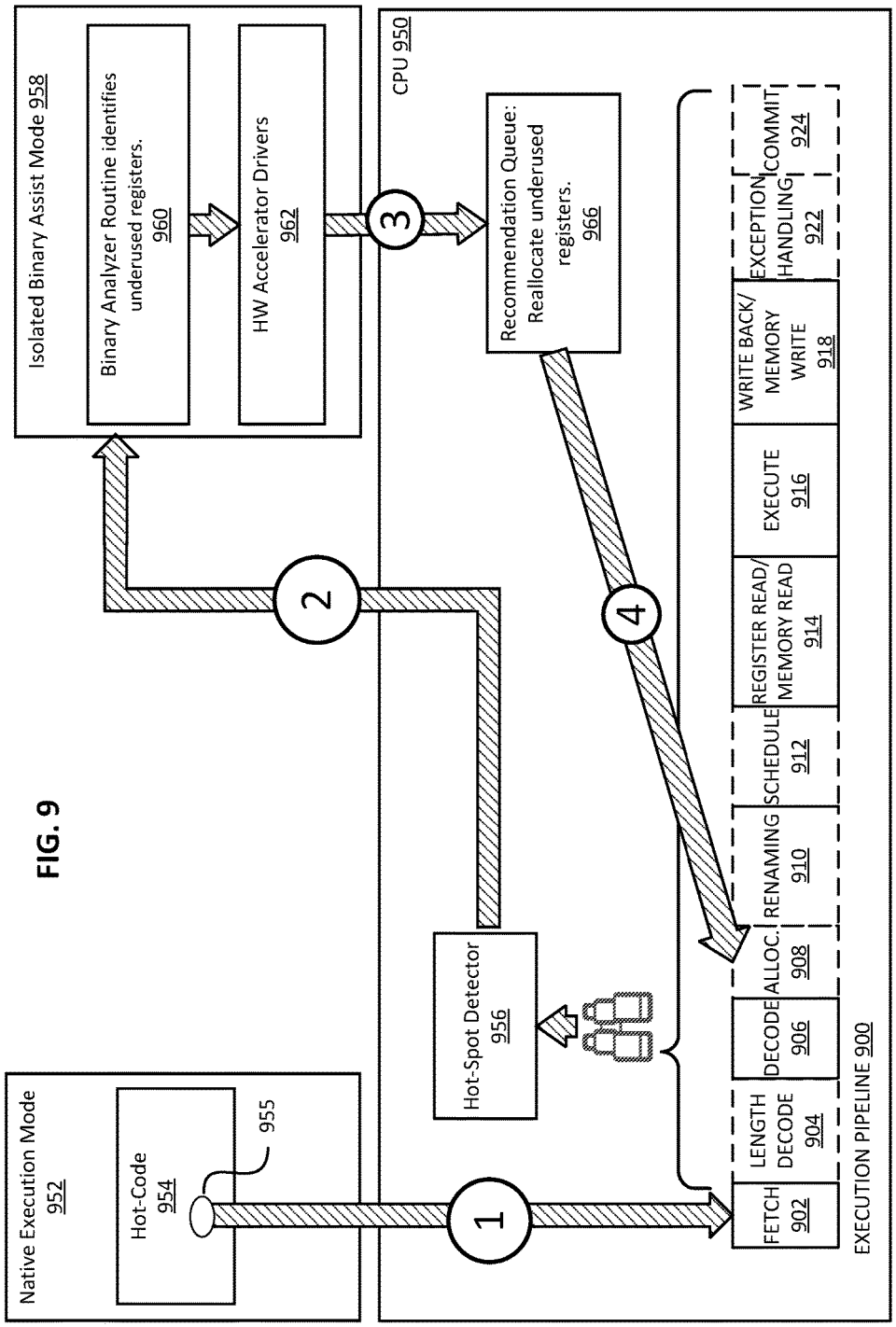
FIG. 9 is an architectural flow diagram of improving processor power-performance using a binary analyzer routine, according to some embodiments.

FIG. 9 is an architectural flow diagram of improving processor power-performance using a binary analyzer routine, according to some embodiments. As shown, CPU 950 includes hot-spot detector 956.

Also shown are two ranges within a memory: a first region, native execution mode 952, includes code to be executed by CPU 950, including hot-code 954. A second region, isolated binary assist mode 958 includes binary analyzer routine 960 and HW accelerator drivers 962.

CPU 950 also includes execution pipeline 900, which includes a fetch 902 stage, a length decode 904 stage, a decode 906 stage, an allocation 908 stage, a renaming 910 stage, a schedule 912 stage (also known as a dispatch or issue stage), a register read/memory read 914 stage, an execute 916 stage, a write back/memory write 918 stage, an exception handling 922 stage, and a commit 924 stage.

In operation, CPU 950 is to fetch instructions from memory at the fetch 902 stage (illustrated by the arrow labeled as "1"), decode the fetched instructions at decode 906 stage, and execute the decoded instructions at execute 916 stage of the pipeline. While CPU 950 fetches, decodes, and executes instructions, hot-spot detector 956 is to monitor execution pipeline 900. In FIG. 9, binoculars are used to indicate that hot-spot detector 956 is to monitor execution pipeline 900. Hot-spot detector 956 is to detect a hot-spot sequence comprising at least one of a loop instruction, a branch instruction, and an instruction repeated at least a threshold number of times. As shown, the hot-spot sequence is detected while executing an instruction 955 that is part of hot-code 954.

Upon detecting the hot-spot sequence, hot-spot detector 956 is to gather hardware metrics relating to execution of the hot-spot sequence and to generate a hot-spot hardware event. In response to the hot-spot hardware event, the processor is to switch context to a binary analyzer routine. In some embodiments, the processor provides a task management mechanism that is used to switch tasks. As illustrated by the arrow labeled as "2," the processor is to switch context to isolated binary assist mode 958. In some embodiments, a binary assist routine is stored in a protected memory region, for example, as described with respect to FIG. 5.

At 960, the binary analyzer routine is to analyze the hardware metrics relating to execution of the hot-spot sequence. The binary analyzer routine in some embodiments also is to analyze a code region in memory around the hot-spot instruction. In some embodiments, the binary analyzer routine analyzes code that was executed long before the hot-spot instruction. In other embodiments, the binary analyzer routine analyzes code that is to be executed long after the hot-spot instruction. As compared to hardware optimization techniques that rely on hardware circuitry, embodiments disclosed herein have an advantage that they have the ability to analyze code stored in the memory, including code that came long before the hot-spot code and code that is to come long after the hot-spot code.

At 960, the binary analyzer routine is to determine that at least one register is underused. For example, a register may have been allocated and subsequently not used. The binary analyzer routine therefore at 960 is to generate a recommendation to reallocate underused registers. In the illustrated embodiment, the recommendation at 962 is to be delivered to hardware accelerator drivers, which in turn at 966 are to store the recommendation into a recommendation queue, by way of the arrow labeled as "3." Register read/memory read 914 pipeline stage is to periodically check the recommendation queue and retrieve recommendations directed to it, which in FIG. 9 is indicated by the arrow labeled as "4." In other embodiments, at 962, the hardware accelerator drivers are to forward the recommendation to the register read/memory read 914 stage of the pipeline. In response to the recommendation, allocation 908 stage of the pipeline is to reallocate underused registers.

Figure 10:
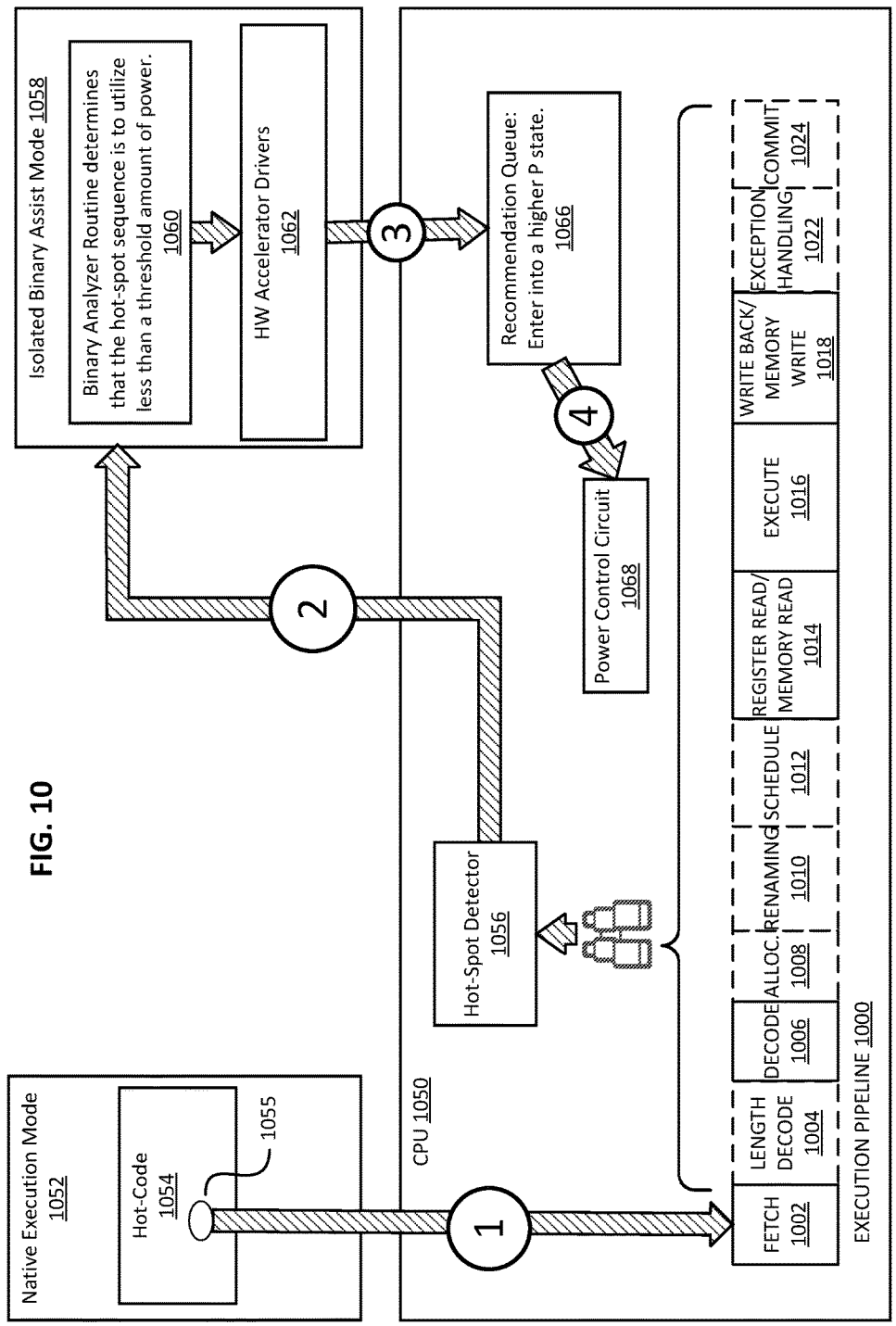
FIG. 10 is an architectural flow diagram of improving processor power-performance using a binary analyzer routine, according to some embodiments.

FIG. 10 is an architectural flow diagram of improving processor power-performance using a binary analyzer routine, according to some embodiments. As shown, CPU 1050 includes hot-spot detector 1056.

Also shown are two ranges within a memory: a first region, native execution mode 1052, includes code to be executed by CPU 1050, including hot-code 1054. A second region, isolated binary assist mode 1058 includes binary analyzer routine 1060 and HW accelerator drivers 1062.

CPU 1050 also includes execution pipeline 1000, which includes a fetch 1002 stage, a length decode 1004 stage, a decode 1006 stage, an allocation 1008 stage, a renaming 1010 stage, a schedule 1012 stage (also known as a dispatch or issue stage), a register read/memory read 1014 stage, an execute 1016 stage, a write back/memory write 1018 stage, an exception handling 1022 stage, and a commit 1024 stage.

In operation, CPU 1050 is to fetch instructions from memory at the fetch 1002 stage (illustrated by the arrow labeled as "1"), decode the fetched instructions at decode 1006 stage, and execute the decoded instructions at execute 1016 stage of the pipeline. While CPU 1050 fetches, decodes, and executes instructions, hot-spot detector 1056 is to monitor execution pipeline 1000. In FIG. 10, binoculars are used to indicate that hot-spot detector 1056 is to monitor execution pipeline 1000. Hot-spot detector 1056 is to detect a hot-spot sequence comprising at least one of a loop instruction, a branch instruction, and an instruction repeated at least a threshold number of times. As shown, the hot-spot sequence is detected while executing an instruction 1055 that is part of hot-code 1054.

Upon detecting the hot-spot sequence, hot-spot detector 1056 is to gather hardware metrics relating to execution of the hot-spot sequence and to generate a hot-spot hardware event. In response to the hot-spot hardware event, the processor is to switch context to a binary analyzer routine. In some embodiments, the processor provides a task management mechanism that is used to switch tasks. As illustrated by the arrow labeled as "2," the processor is to switch context to isolated binary assist mode 1058. In some embodiments, a binary assist routine is stored in a protected memory region, for example, as described with respect to FIG. 5.

At 1060, the binary analyzer routine is to analyze the hardware metrics relating to execution of the hot-spot sequence. The binary analyzer routine in some embodiments also is to analyze a code region in memory around the hot-spot instruction. In some embodiments, the binary analyzer routine analyzes code that was executed long before the hot-spot instruction. In other embodiments, the binary analyzer routine analyzes code that is to be executed long after the hot-spot instruction. As compared to hardware optimization techniques that rely on hardware circuitry, embodiments disclosed herein have an advantage that they have the ability to analyze code stored in the memory, including code that came long before the hot-spot code and code that is to come long after the hot-spot code.

At 1060, the binary analyzer routine is to determine that the hot-spot sequence is to utilize less than a threshold amount of power. In the illustrated embodiment, processor 1050 is to comply with the Advanced Configuration and Power Interface (ACPI) Specification, Version 5.0, Errata A, Published Nov. 13, 2013 as published and maintained by the Unified Extensible Firmware Interface Forum. The ACPI Specification defines four processor power states, C0 to C3, with C0 being an operational state and C1 to C3 being reduced power states. Some processors use even higher C states, for example some processors include C states up to C0. Furthermore, some embodiments of processors define performance states P0 to Pn that define different power states when the processor is in the C0 operation state. In such embodiments, P0 is the highest power state, and each subsequent state uses less power. In the illustrated embodiment, therefore, the binary analyzer routine at 1060 is to recommend that the processor transition into a lower-power power state, for example a higher P-state. The recommendation at 1062 is to be delivered to hardware accelerator drivers, which in turn at 1066 are to store the recommendation into a recommendation queue, by way of the arrow labeled as "3." Power control circuit 1068 is to periodically check the recommendation queue and retrieve recommendations directed to it, which in FIG. 10 is indicated by the arrow labeled as "4." In other embodiments, at 1062, the hardware accelerator drivers are to forward the recommendation directly to power control circuit 1068, rather than to use the recommendation queue. In response to the recommendation, power control circuit 1068 is to transition the processor to a higher P-state.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or another data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an Instruction Set Architecture (ISA) is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of Single Instruction, Multiple Data (SIMD) extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, Sep. 2014; and see Intel® Advanced Vector Extensions Programming Reference, Oct. 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11A:
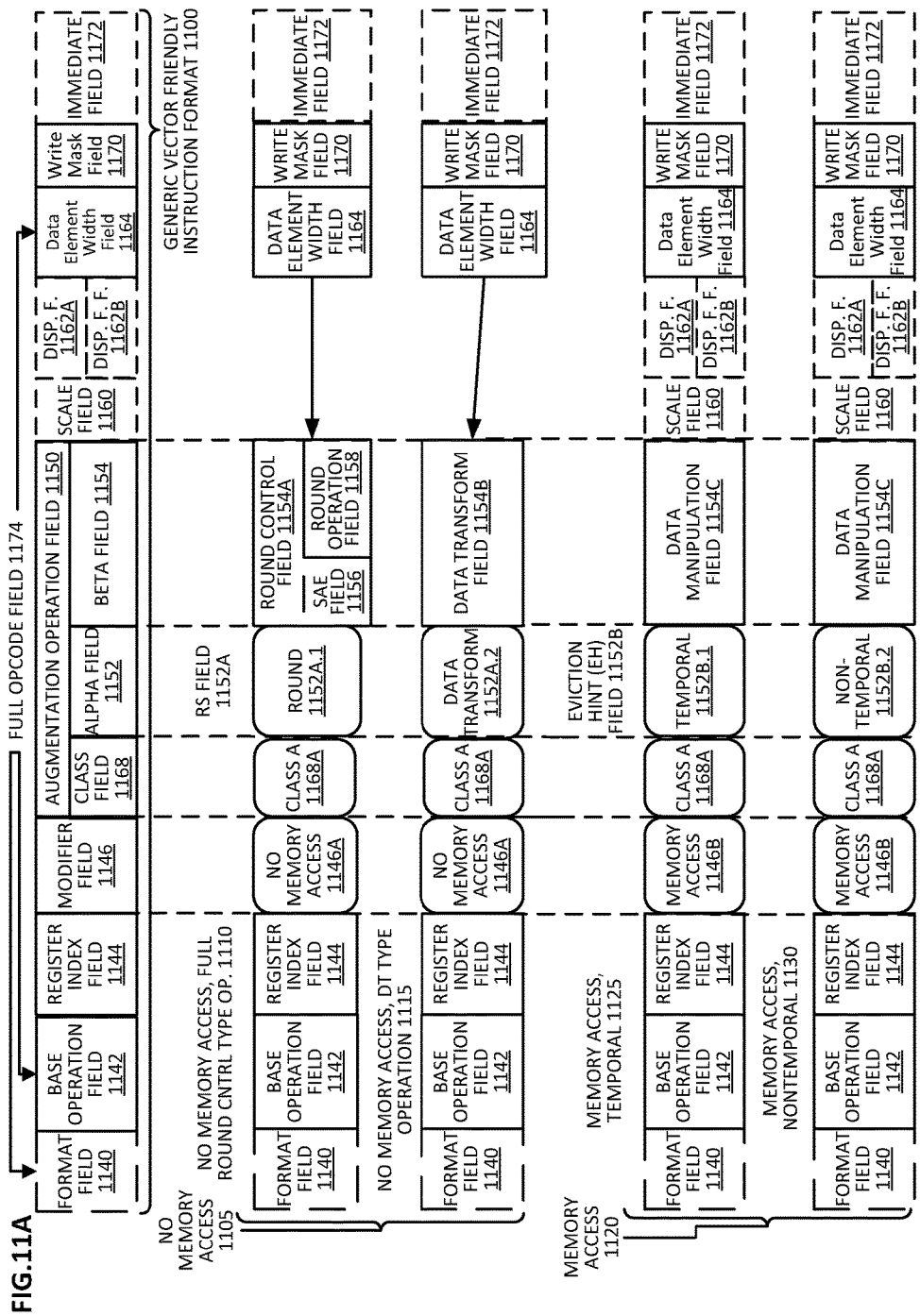
FIGS. 11A-11B are block diagrams illustrating a generic vector friendly instruction format and instruction templates thereof according to embodiments of the invention.
Figure 11B:
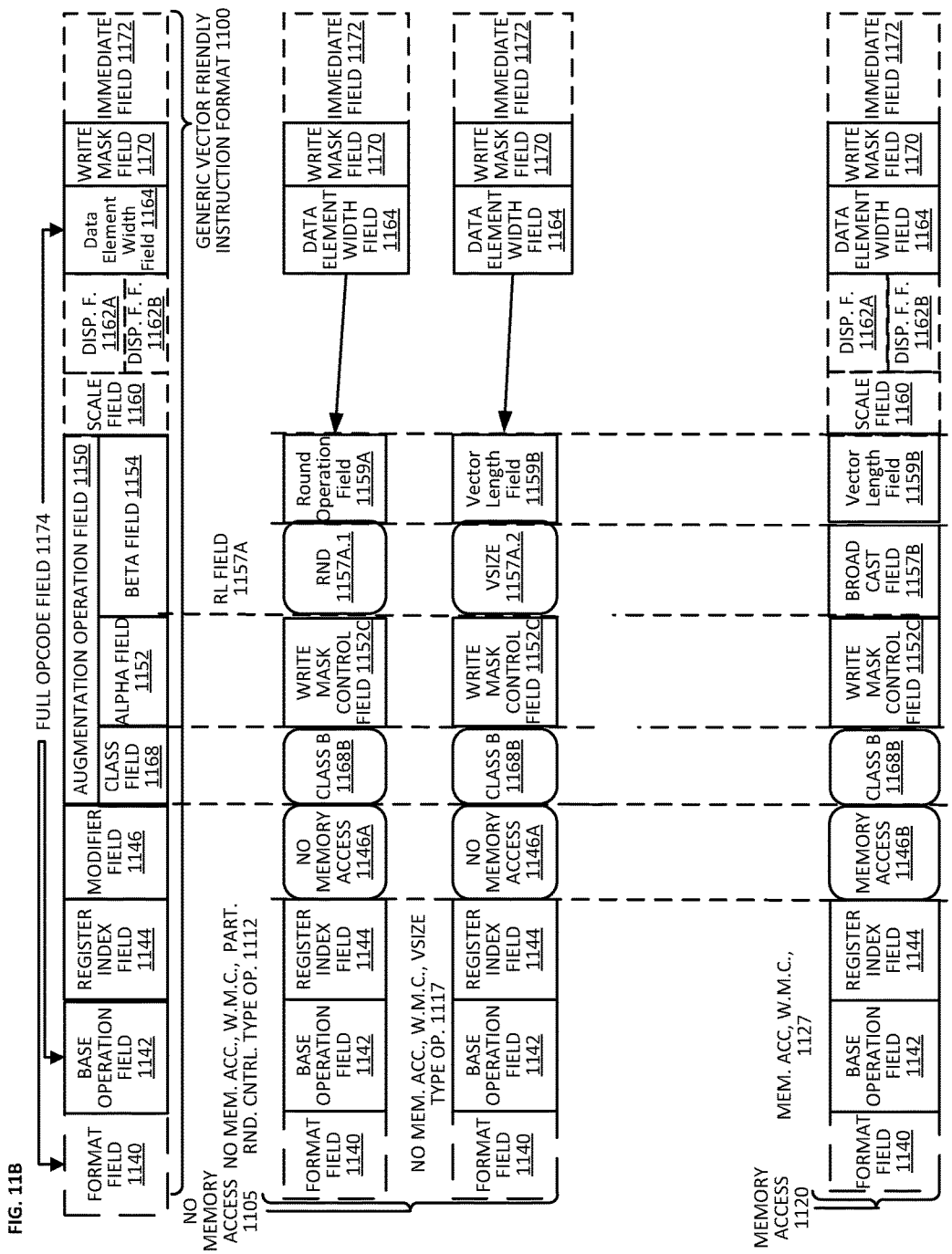

FIGS. 11A-11B are block diagrams illustrating a generic vector friendly instruction format and instruction templates thereof according to embodiments of the invention. FIG. 11A is a block diagram illustrating a generic vector friendly instruction format and class A instruction templates thereof according to embodiments of the invention; while FIG. 11B is a block diagram illustrating the generic vector friendly instruction format and class B instruction templates thereof according to embodiments of the invention. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes)

(and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the invention, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*index+base$).

Displacement Field 1162A—its content is used as part of memory address generation (e.g., for address generation that uses $2^{scale}*index+base+displacement$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein in reference to FIG. 12B) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the invention are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement factor field 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the invention the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the invention where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement factor field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement factor field 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Roundto-nearest). Thus, the round operation control field 1159A allows for the changing of the rounding mode on a per instruction basis. In one embodiment of the invention where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement factor field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implemented in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 12A is a block diagram illustrating an exemplary specific vector friendly instruction format according to embodiments of the invention. FIG. 12A shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 12A map are illustrated.

It should be understood that, although embodiments of the invention are described with reference to the specific vector friendly instruction format 1200 in the context of the generic vector friendly instruction format 1100 for illustrative purposes, the invention is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the invention is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0x62 (the unique value used for distinguishing the vector friendly instruction format in one embodiment of the invention).

The second-fourth bytes (EVEX Bytes 1-3) include a number of bit fields providing specific capability.

REX field 1205 (EVEX Byte 1, bits [7-5])—consists of a EVEX.R bit field (EVEX Byte 1, bit [7]—R), EVEX.X bit field (EVEX byte 1, bit [6]—X), and 1157BEX byte 1, bit [5]—B). The EVEX.R, EVEX.X, and EVEX.B bit fields provide the same functionality as the corresponding VEX bit fields, and are encoded using 1s complement form, i.e., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]—mmmm)—its content encodes an implied leading opcode byte (0F, 0F 38, or 0F 3).

Data element width field 1164 (EVEX byte 2, bit [7]—W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.U 1168 Class field (EVEX byte 2, bit [2]-U)—If EVEX.U=0, it indicates class A or EVEX.U0; if EVEX.U=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1154 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

Scale, Index, Base (SIB) Byte (Byte 6)—As previously described, the scale field's 1150 content is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1172 operates as previously described.

Full Opcode Field

Figure 12D:
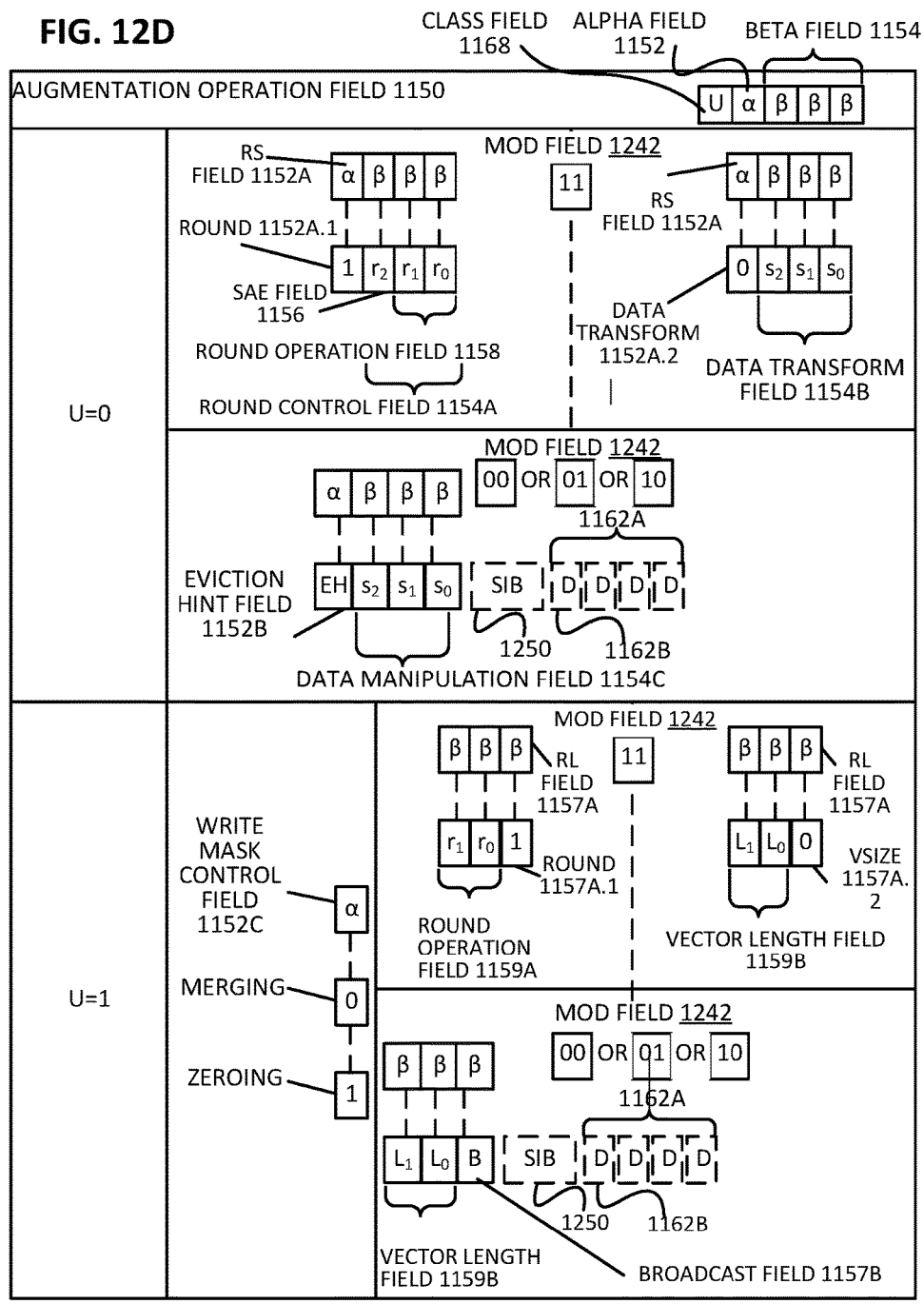
FIG. 12D is a block diagram illustrating the fields of the specific vector friendly instruction format 1200 that make up the augmentation operation field 1150 according to one embodiment of the invention.

FIG. 12B is a block diagram illustrating the fields of the specific vector friendly instruction format 1200 that make up the full opcode field 1174 according to one embodiment of the invention. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.
Register Index Field FIG. 12C is a block diagram illustrating the fields of the specific vector friendly instruction format 1200 that make up the register index field 1144 according to one embodiment of the invention. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.
Augmentation Operation Field FIG. 12D is a block diagram illustrating the fields of the specific vector friendly instruction format 1200 that make up the augmentation operation field 1150 according to one embodiment of the invention. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]—EH) is interpreted as the rs field 1152A. When the rs field 1152A contains a 1 (round 1152A.1), the beta field 1154 (EVEX byte 3, bits [6:4]—SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]—SSS) is interpreted as a three bit data transform field 1154B. When U=0 and the MOD field 1242 contains 00, 01, or 10 (signifying a memory access operation), the alpha field 1152 (EVEX byte 3, bit [7]—EH) is interpreted as the eviction hint (EH) field 1152B and the beta field 1154 (EVEX byte 3, bits [6:4]—SSS) is interpreted as a three bit data manipulation field 1154C.

Figure 13:
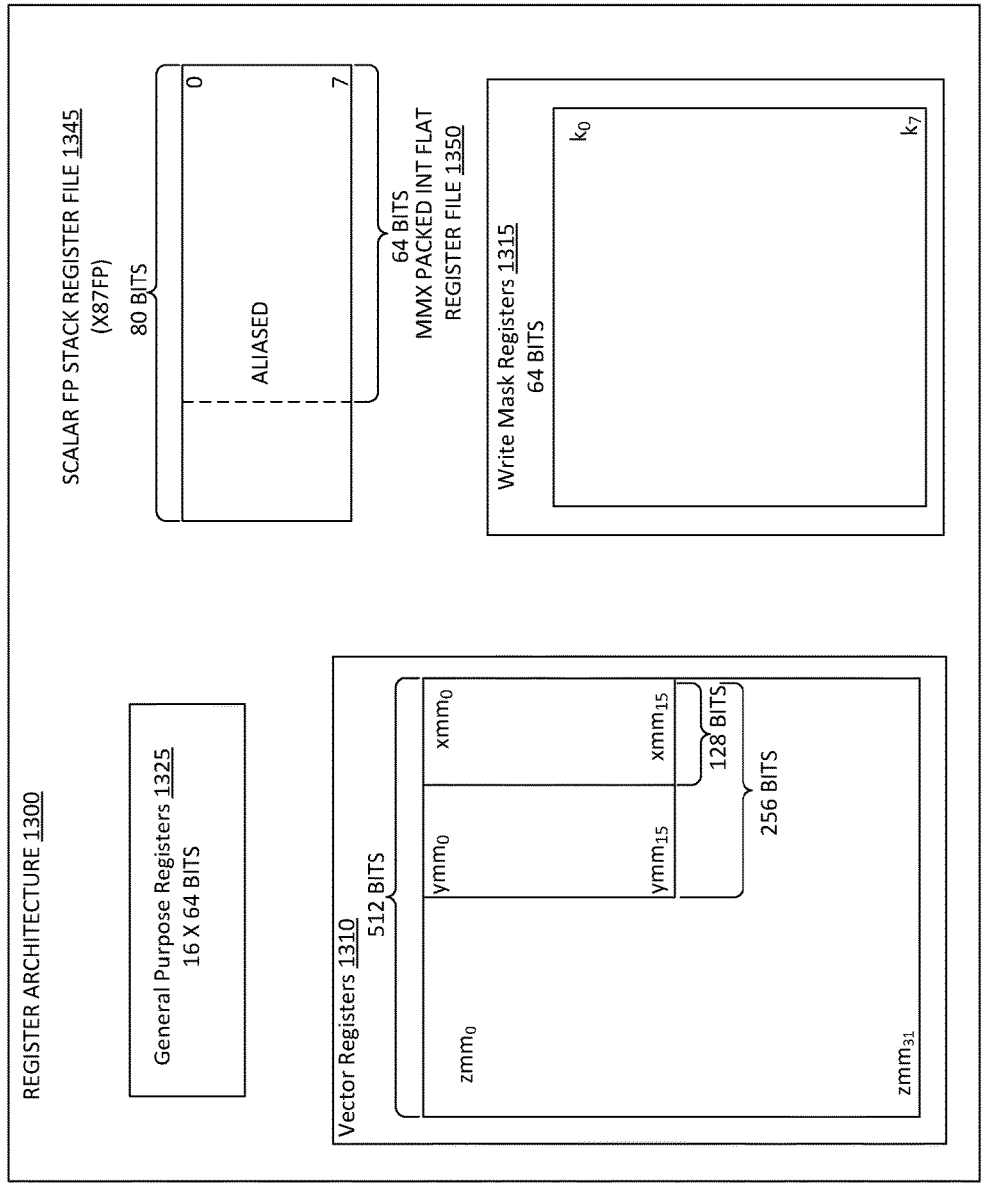
FIG. 13 is a block diagram of a register architecture 1300 according to one embodiment of the invention.

When U=1, the alpha field 1152 (EVEX byte 3, bit [7]—EH) is interpreted as the write mask control (Z) field 1152C. When U=1 and the MOD field 1242 contains 11 (signifying a no memory access operation), part of the beta field 1154 (EVEX byte 3, bit [4]—$S_0$) is interpreted as the RL field 1157A; when it contains a 1 (round 1157A.1) the rest of the beta field 1154 (EVEX byte 3, bit [6-5]—$S_{2-1}$) is interpreted as the round operation field 1159A, while when the RL field 1157A contains a 0 (VSIZE 1157.A2) the rest of the beta field 1154 (EVEX byte 3, bit [6-5]—$S_{2-1}$) is interpreted as the vector length field 1159B (EVEX byte 3, bit [6-5]—$L_{1-0}$). When U=1 and the MOD field 1242 contains 00, 01, or 10 (signifying a memory access operation), the beta field 1154 (EVEX byte 3, bits [6:4]—SSS) is interpreted as the vector length field 1159B (EVEX byte 3, bit [6-5]—$L_{1-0}$) and the broadcast field 1157B (EVEX byte 3, bit [4]—B).
Exemplary Register Architecture FIG. 13 is a block diagram of a register architecture 1300 according to one embodiment of the invention. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
|---|---|---|---|
| Instruction Templates that do not include the vector length field 1159B | A (FIG. 11A; U = 0) | 1110, 1115, 1125, 1130 | zmm registers (the vector length is 64 byte) |
| | B (FIG. 11B; U = 1) | 1112 | zmm registers (the vector length is 64 byte) |
| Instruction templates that do include the vector length field 1159B | B (FIG. 11B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and Out-of-order Core Block Diagram

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1(L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 15B:
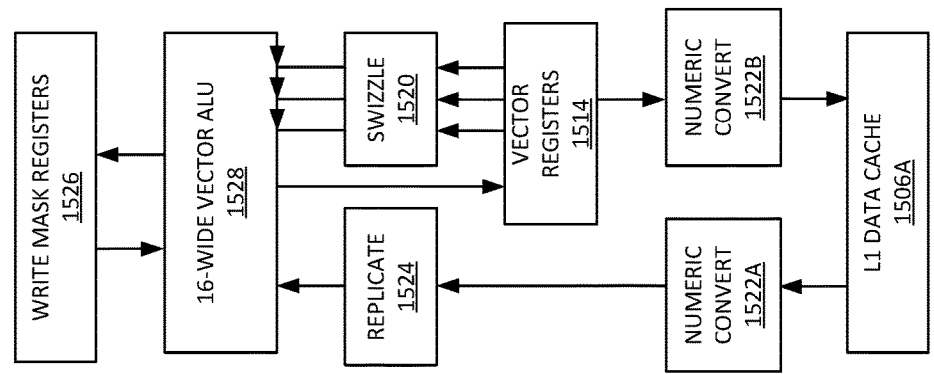
FIGS. 15A-B illustrate a block diagram of a more specific exemplary in-order core architecture, which core would be one of several logic blocks (including other cores of the same type and/or different types) in a chip.
Figure 15A:
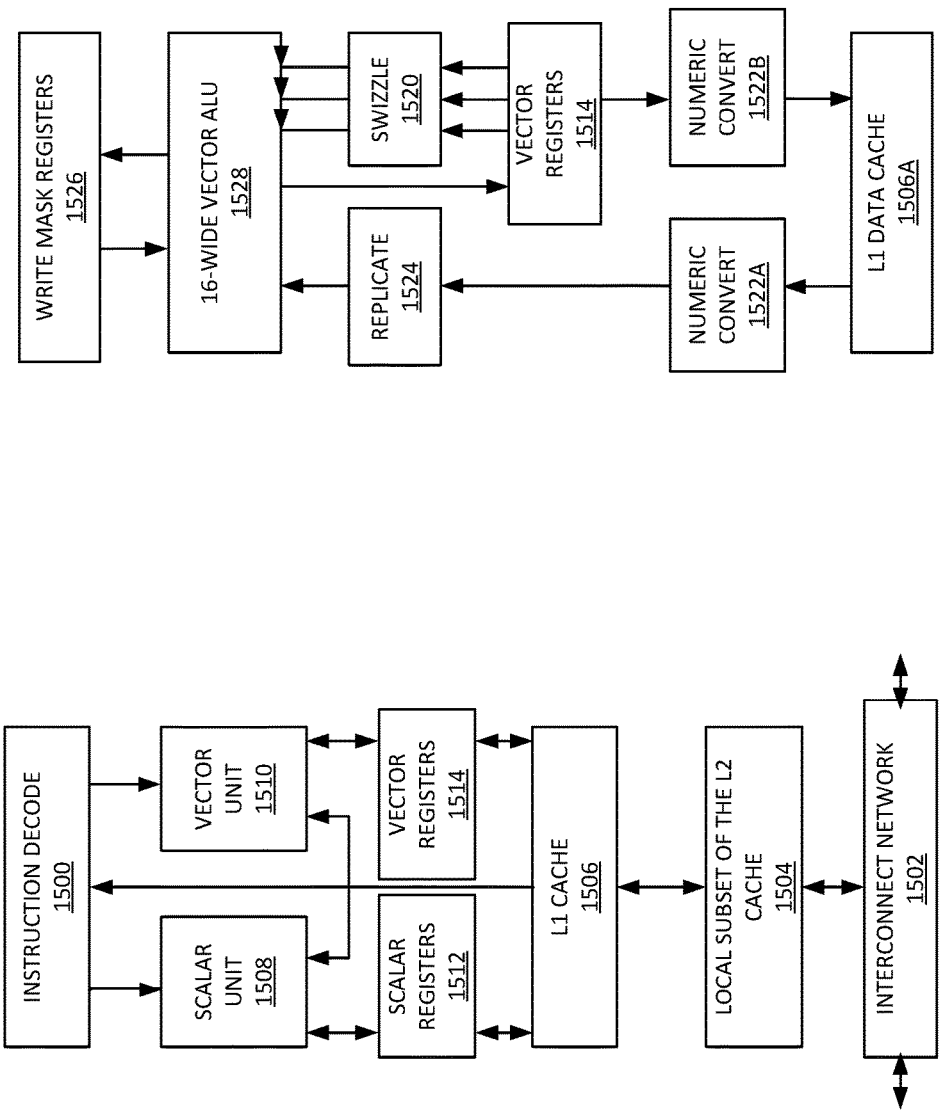

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the invention. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
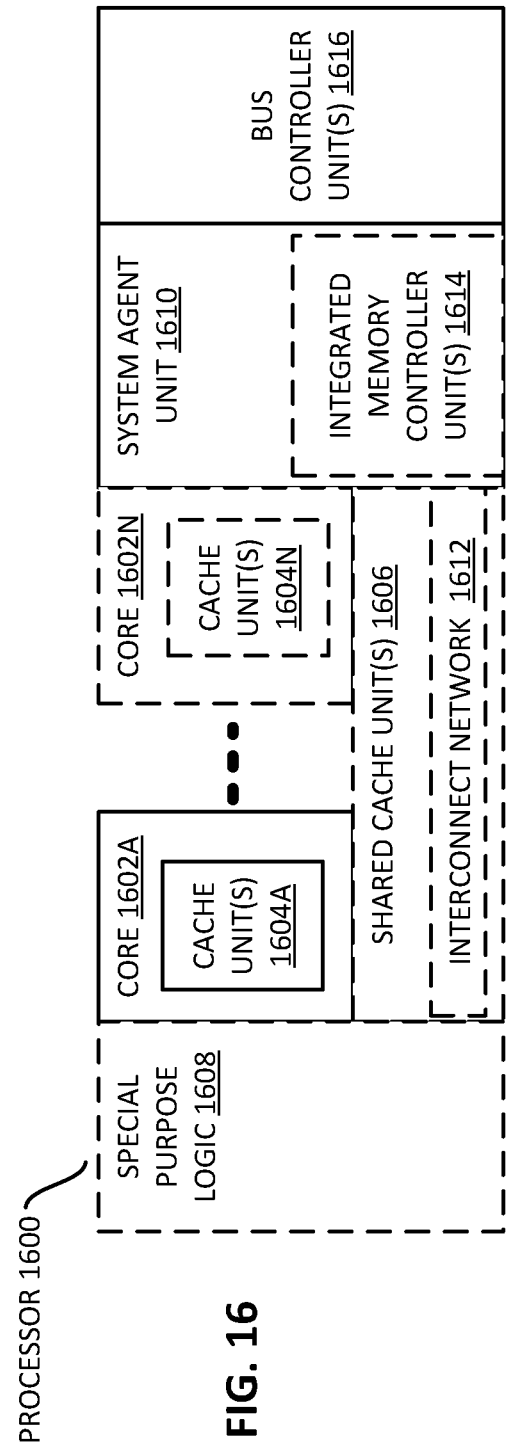
FIG. 16 is a block diagram of a processor 1600 that may have more than one core, may have an integrated memory controller, and may have integrated graphics according to embodiments of the invention.

FIG. 16 is a block diagram of a processor 1600 that may have more than one core, may have an integrated memory controller, and may have integrated graphics according to embodiments of the invention. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608 (integrated graphics logic 1608 is an example of and is also referred to herein as special purpose logic), the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
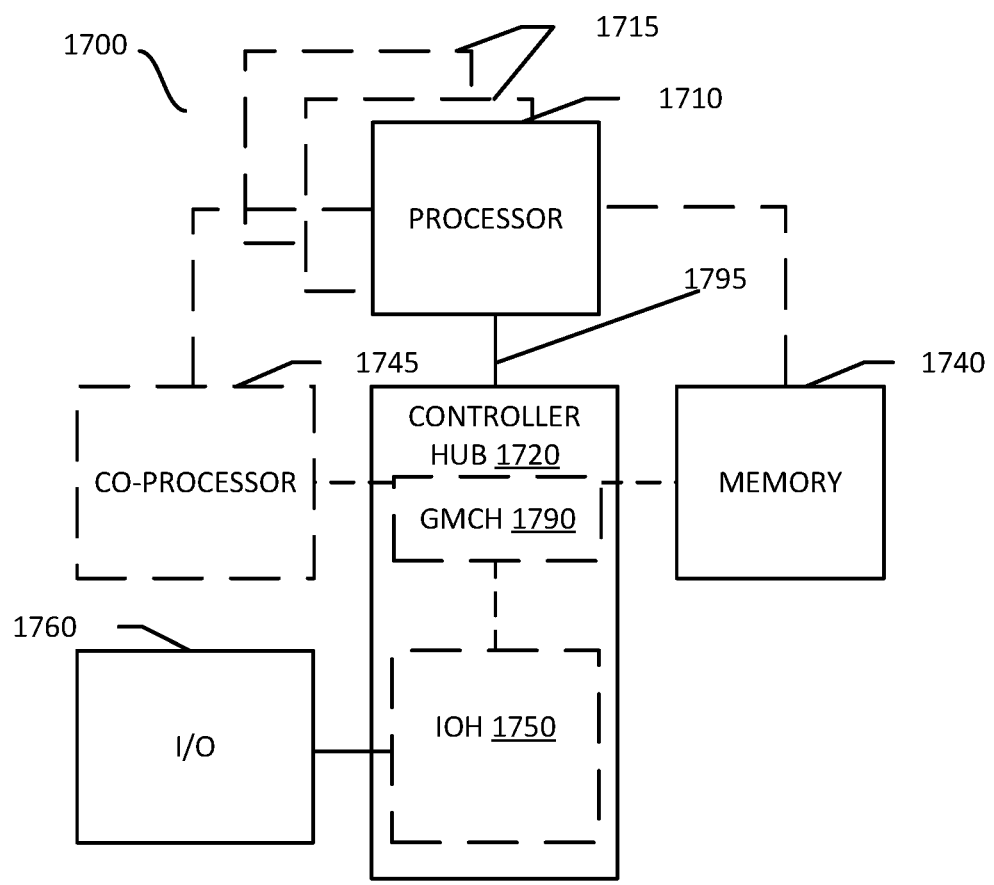
FIGS. 17-20 are block diagrams of exemplary computer architectures.

Referring now to FIG. 17, shown is a block diagram of a system 1700 in accordance with one embodiment of the present invention. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as QuickPath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
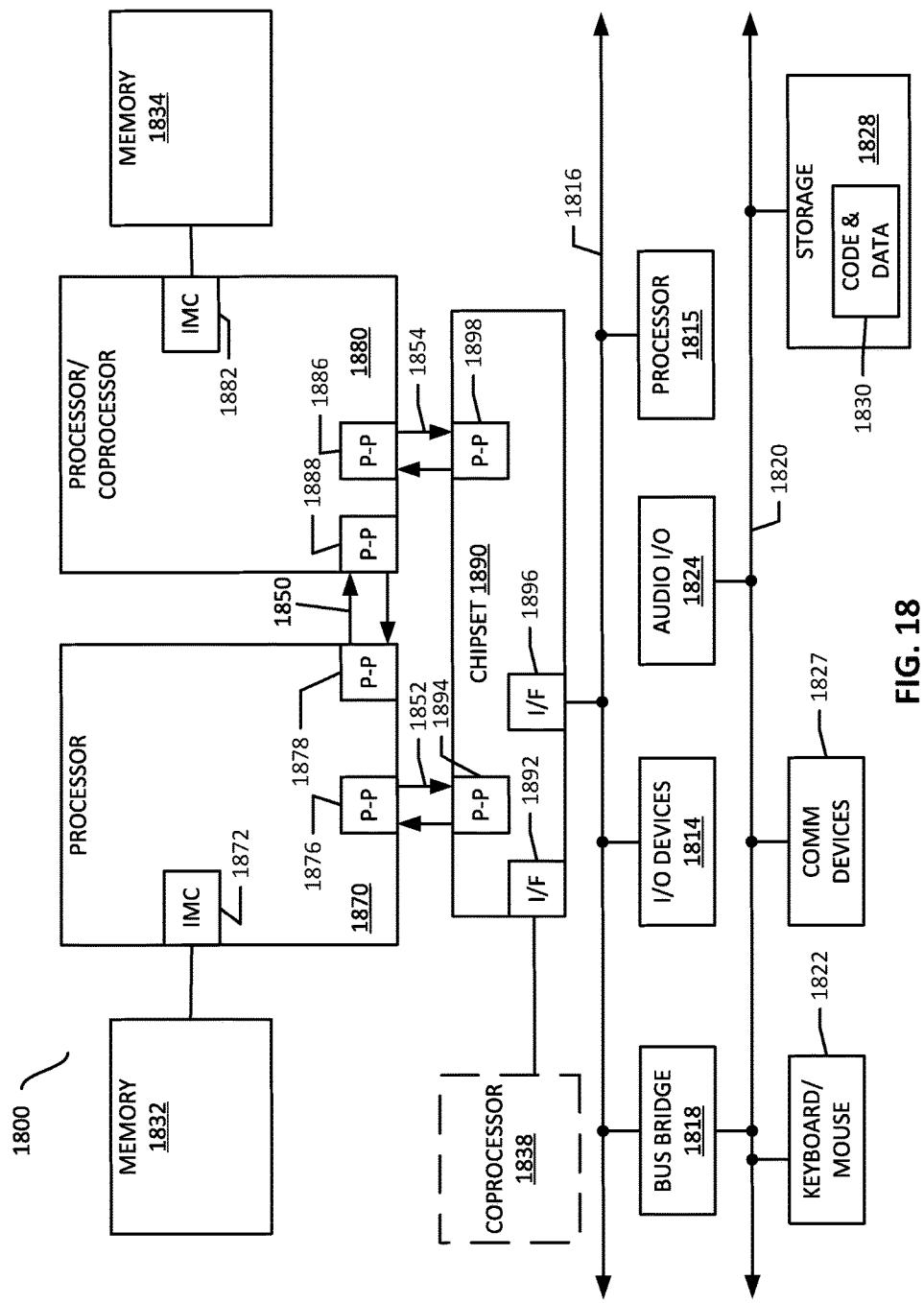

Referring now to FIG. 18, shown is a block diagram of a first more specific exemplary system 1800 in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the invention, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1892. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present invention is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
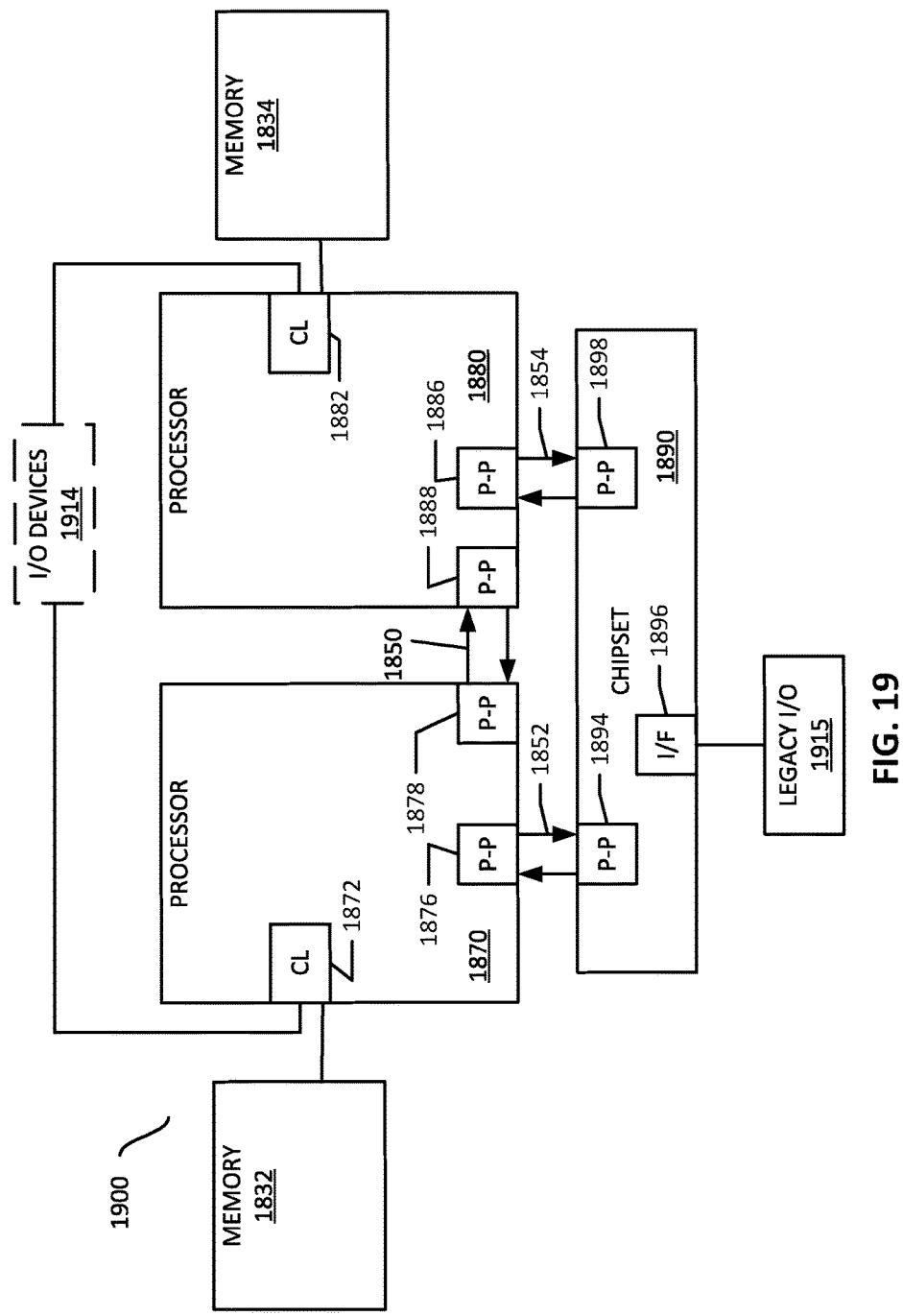

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
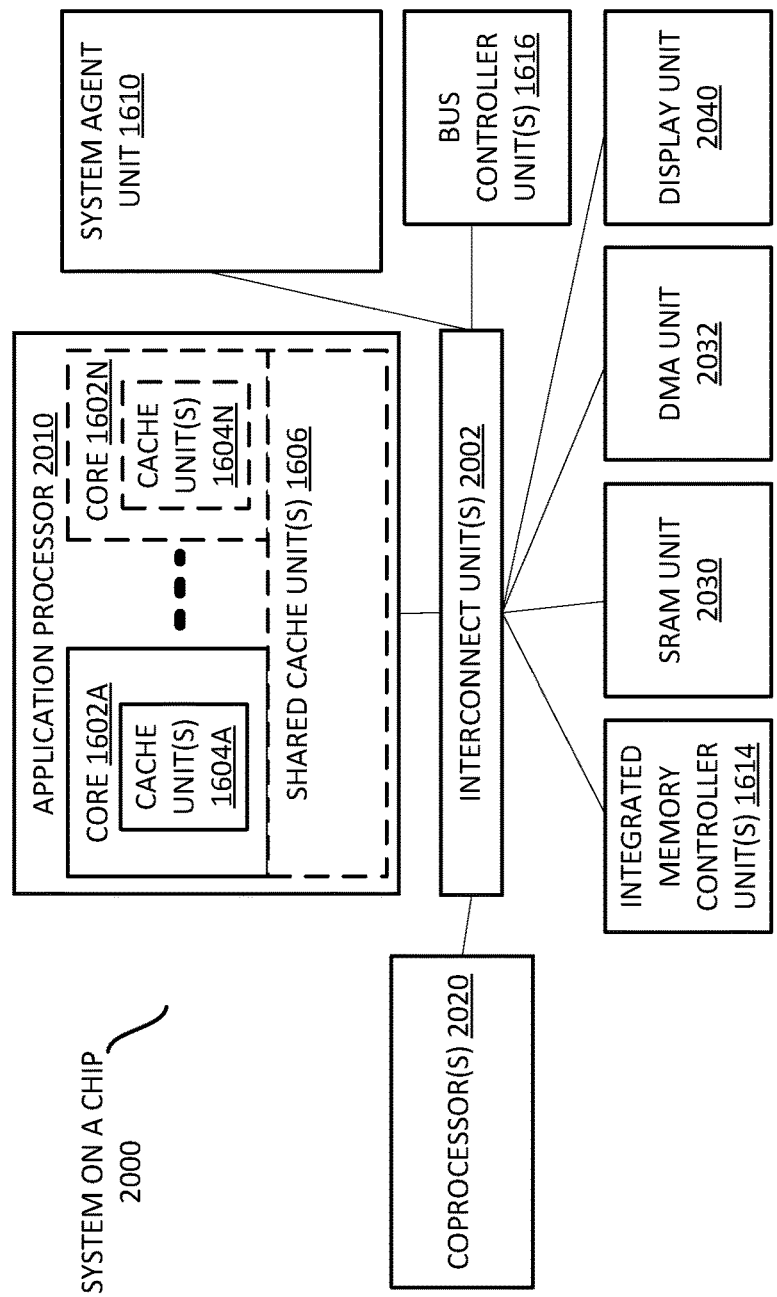

Referring now to FIG. 20, shown is a block diagram of a SoC 2000 in accordance with an embodiment of the present invention. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 1602A-N, which include cache units 1604A-N, and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a non-statutory machine-readable medium (or non-statutory computer-readable medium) which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 21 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

FURTHER EXAMPLES

Example 1 provides a processor including a memory interface to couple to a memory; at least one hardware accelerator circuit; and an execution pipeline including at least fetch, decode, and execute stages; wherein the processor, in response to a hot-spot hardware event indicating presence of a hot-spot sequence, is to switch context to a binary analyzer routine stored in the memory, the binary analyzer routine including instructions that, when fetched, decoded, and executed by the processor, cause the processor to analyze a region in the memory containing the hot-spot sequence; analyze hardware metrics relating to execution of the hot-spot sequence; and generate, based on the analyses, a recommendation for the at least one hardware accelerator circuit to improve at least one of power consumption and performance.

Example 2 includes the substance of the processor of Example 1, further including a hot-spot detector circuit to monitor the execution pipeline, detect the hot-spot sequence, gather the hardware metrics relating to execution of the hot-spot sequence, and generate the hot-spot hardware event.

Example 3 includes the substance of the processor of any one of Examples 1 to 2, wherein the hot-spot sequence comprises at least one of a branch instruction, a loop instruction, a memory access to at least one of a loop index, a loop constant, and a loop invariant, and an instruction that has repeated at least a threshold number of times.

Example 4 includes the substance of the processor of any one of Examples 1 to 2, wherein the processor provides a memory protection mechanism, and wherein the binary analyzer routine uses the memory protection mechanism to define protected memory regions in which to store a code segment, a data segment, and a stack segment of the binary analyzer routine.

Example 5 includes the substance of the processor of any one of Examples 1 to 2, wherein the binary analyzer routine is further to store the recommendation in the data segment for future use, and wherein the recommendation is generated once and used to generate recommendations for future occurrences of the hot-spot sequence.

Example 6 includes the substance of the processor of any one of Examples 1 to 2, wherein when the binary analyzer routine determines the hot-spot sequence receives an invariant value in response to a plurality of memory read requests, the binary analyzer routine is to generate a recommendation that a register/memory read stage of the execution pipeline convert the plurality of memory read requests into register read requests, and to store the invariant value in a register.

Example 7 includes the substance of the processor of any one of Examples 1 to 2, wherein when the binary analyzer routine determines that an instruction source operand value is predictable, the binary analyzer routine is to generate a recommendation that a register/memory read stage of the execution pipeline use a predicted value for the instruction source operand.

Example 8 includes the substance of the processor of any one of Examples 1 to 2, wherein the binary analyzer routine is to generate a recommendation to a schedule stage of the execution pipeline to conduct a speculative execution of the hot-spot sequence, and to prepare to roll back the speculative execution.

Example 9 includes the substance of the processor of Example 8, wherein the binary analyzer routine is to generate a recommendation that the schedule stage begin speculative execution at a first linear instruction address, and to stop speculative execution at a second linear instruction access.

Example 10 includes the substance of the processor of any one of Examples 1 to 2, wherein when the binary analyzer routine identifies underused registers, the binary analyzer routine is to generate a recommendation to a register allocate stage of the execution pipeline to reallocate the underused registers.

Example 11 includes the substance of the processor of any one of Examples 1 to 2, wherein when the binary analyzer routine determines that the hot-spot sequence is to utilize less than a threshold amount of power, the binary analyzer routine is to generate a recommendation to a power control circuit of the processor to enter into a lower-power power state.

Example 12 provides a system including a memory interface to couple to a memory; at least one hardware accelerator circuit; and a processing core including an execution pipeline including at least fetch, decode, and execute stages; wherein the processing core, in response to a hot-spot hardware event indicating presence of a hot-spot sequence, is to switch context to a binary analyzer routine stored in the memory, the binary analyzer routine including instructions that, when fetched, decoded, and executed by the processing core, cause the processing core to analyze a region in the memory containing the hot-spot sequence; analyze hardware metrics relating to execution of the hot-spot sequence; and generate, based on the analyses, a recommendation for the at least one hardware accelerator circuit to improve at least one of power consumption and performance.

Example 13 includes the substance of the system of Example 12, further including a hot-spot detector to monitor the execution pipeline, to detect the hot-spot sequence, to gather the hardware metrics, and to generate the hot-spot hardware event.

Example 14 includes the substance of the system of any one of Examples 12 to 13, wherein when the binary analyzer routine determines the hot-spot sequence receives an invariant value in response to a plurality of memory read requests, the binary analyzer routine is to generate a recommendation that a register/memory read stage of the execution pipeline convert the plurality of memory read requests into register read requests, and to store the invariant value in a register.

Example 15 includes the substance of the system of any one of Examples 12 to 13, wherein when the binary analyzer routine determines that an instruction source operand value is predictable, the binary analyzer routine is to generate a recommendation that a register/memory read stage of the execution pipeline use a predicted value for the instruction source operand.

Example 16 includes the substance of the system of any one of Examples 12 to 13, wherein the binary analyzer routine is to generate a recommendation to a schedule stage of the execution pipeline to conduct a speculative execution of the hot-spot sequence, and to prepare to roll back the speculative execution.

Example 17 includes the substance of the system of any one of Examples 12 to 13, wherein when the binary analyzer routine identifies underused registers, the binary analyzer routine is to generate a recommendation to a register allocate stage of the execution pipeline to reallocate the underused registers.

Example 18 includes the substance of the system of any one of Examples 12 to 13, wherein when the binary analyzer routine determines that the hot-spot sequence is to utilize less than a threshold amount of power, the binary analyzer routine is to generate a recommendation to a power control circuit to enter into a lower-power power state.

Example 19 provides a method to be performed by a processor including a memory interface to couple to a memory, at least one hardware accelerator circuit, and an execution pipeline including at least fetch, decode, and execute stages, the method including fetching, decoding, and executing instructions; switching context, in response to a hot-spot hardware event indicating presence of a hot-spot sequence, to a binary analyzer routine stored in the memory, the binary analyzer routine including instructions that, when fetched, decoded, and executed by the processor, cause the processor to analyze a region in the memory containing the hot-spot sequence; analyze hardware metrics relating to execution of the hot-spot sequence; and generate, based on the analyses, a recommendation for the at least one hardware accelerator circuit to improve at least one of power consumption and performance.

Example 20 includes the substance of the method of Example 19, having stored therein further instructions, which, when executed by the processor, cause a hot-spot detector in the processor to monitor the execution pipeline, detect the hot-spot sequence, gather the hardware metrics, and generate the hot-spot hardware event.

Example 21 includes the substance of the method of any one of Examples 19 to 20, wherein when the binary analyzer routine determines the hot-spot sequence receives an invariant value in response to a plurality of memory read requests, the binary analyzer routine is to generate a recommendation that a register/memory read stage of the execution pipeline convert the plurality of memory read requests into register read requests, and to store the invariant value in a register.

Example 22 includes the substance of the method of any one of Examples 19 to 20, wherein when the binary analyzer routine determines that an instruction source operand value is predictable, the binary analyzer routine is to generate a recommendation that a register/memory read stage of the execution pipeline use a predicted value for the instruction source operand.

Example 23 includes the substance of the method of any one of Examples 19 to 20, wherein the binary analyzer routine determines to generate a recommendation to a scheduling stage of the execution pipeline to conduct a speculative execution of the hot-spot sequence, and to prepare to roll back the speculative execution.

Example 24 includes the substance of the method of any one of Examples 19 to 20, wherein when the binary analyzer routine identifies underused registers, the binary analyzer routine is to generate a recommendation to a register allocate stage of the execution pipeline to reallocate the underused registers.

Example 25 includes the substance of the method of any one of Examples 19 to 20, wherein when the binary analyzer routine determines that the hot-spot sequence is utilizing less than a threshold amount of power, the binary analyzer routine is to generate a recommendation to a power control circuit of the processor to enter into a lower-power power state.

Example 26 provides an apparatus including at least one hardware accelerator circuit; means for fetching, decoding, and executing instructions from a memory; means for switching context, in response to a hot-spot hardware event indicating presence of a hot-spot sequence, to a binary analyzer routine stored in the memory; means for fetching, decoding, and executing the binary analyzer routine to analyze a region in the memory containing the hot-spot sequence; to analyze hardware metrics relating to execution of the hot-spot sequence; and to generate, based on the analyses, a recommendation for the at least one hardware accelerator circuit to improve at least one of power consumption and performance.

Example 27 includes the substance of the apparatus of Example 26, further including means for monitoring the means for fetching, decoding, and executing instructions, means for detecting the hot-spot sequence, means for gathering the hardware metrics relating to execution of the hot-spot sequence, and means for generating the hot-spot hardware event.

Example 28 includes the substance of the apparatus of any one of Examples 26 to 27, further including means for protecting memory, and wherein the means for fetching, decoding, and executing the binary analyzer routine further to use the means for protecting memory to define protected memory regions in which to store a code segment, a data segment, and a stack segment of the binary analyzer routine.

Example 29 provides a non-transitory computer-readable storage medium having stored therein instructions, which, when executed by a processor including a memory interface to couple to a memory, at least one hardware accelerator circuit, and an execution pipeline including at least fetch, decode, and execute stages, cause the processor to perform a method including fetching, decoding, and executing instructions; switching context, in response to a hot-spot hardware event indicating presence of a hot-spot sequence, to a binary analyzer routine stored in the memory, the binary analyzer routine including instructions that, when fetched, decoded, and executed by the processor, cause the processor to analyze a region in the memory containing the hot-spot sequence; analyze hardware metrics relating to execution of the hot-spot sequence; and generate, based on the analyses, a recommendation for the at least one hardware accelerator circuit to improve at least one of power consumption and performance.

Example 30 includes the substance of the non-transitory computer-readable storage medium of Example 29, having stored therein further instructions, which, when executed by the processor, cause a hot-spot detector in the processor to monitor the execution pipeline, detect the hot-spot sequence, gather the hardware metrics, and generate the hot-spot hardware event.

Example 31 includes the substance of the non-transitory computer-readable storage medium of any one of Examples 29 to 30, wherein when the binary analyzer routine determines the hot-spot sequence receives an invariant value in response to a plurality of memory read requests, the binary analyzer routine is to generate a recommendation that a register/memory read stage of the execution pipeline convert the plurality of memory read requests into register read requests, and to store the invariant value in a register.

Example 32 includes the substance of the non-transitory computer-readable storage medium of any one of Examples 29 to 30, wherein when the binary analyzer routine determines that an instruction source operand value is predictable, the binary analyzer routine is to generate a recommendation that a register/memory read stage of the execution pipeline use a predicted value for the instruction source operand.

Example 33 includes the substance of the non-transitory computer-readable storage medium of any one of Examples 29 to 30, wherein the binary analyzer routine determines to generate a recommendation to a scheduling stage of the execution pipeline to conduct a speculative execution of the hot-spot sequence, and to prepare to roll back the speculative execution.

Example 34 includes the substance of the non-transitory computer-readable storage medium of any one of Examples 29 to 30, wherein when the binary analyzer routine identifies underused registers, the binary analyzer routine is to generate a recommendation to a register allocate stage of the execution pipeline to reallocate the underused registers.

Example 35 includes the substance of the non-transitory computer-readable storage medium of any one of Examples 29 to 30, wherein when the binary analyzer routine determines that the hot-spot sequence is utilizing less than a threshold amount of power, the binary analyzer routine is to generate a recommendation to a power control circuit of the processor to enter into a lower-power power state.

Although some embodiments disclosed herein involve data handling and distribution in the context of hardware execution circuits, other embodiments can be accomplished by way of a data or instructions stored on a non-transitory machine-readable, tangible medium (also referred to as non-transitory computer-readable storage medium), which, when performed by a machine, cause the machine to perform functions consistent with at least one embodiment. In one embodiment, functions associated with embodiments of the present disclosure are embodied in machine-executable instructions. The instructions can be used to cause a general-purpose or special-purpose processor that is programmed with the instructions to perform the steps of the at least one embodiment. Embodiments disclosed herein are provided as a computer program product or software which includes a machine or computer-readable medium having stored thereon instructions which are used to program a computer (or other electronic devices) to perform one or more operations according to the at least one embodiment. Alternatively, steps of some embodiments are performed by specific hardware components that contain fixed-function logic for performing the steps, or by any combination of programmed computer components and fixed-function hardware components.

Instructions used to program logic to perform the at least one embodiment can be stored within a memory in the system, such as DRAM, cache, flash memory, or other storage. Furthermore, the instructions can be distributed via a network or by way of another computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

What is claimed is:

1. A processor comprising:
   a memory interface to couple to a memory;
   at least one hardware accelerator circuit; and
   an execution pipeline comprising at least fetch, decode, and execute stages;
   wherein the processor, in response to a hot-spot hardware event indicating presence of a hot-spot sequence, is to switch context to a binary analyzer routine stored in the memory, the binary analyzer routine comprising instructions that, when fetched, decoded, and executed by the processor, cause the processor to analyze a region in the memory containing the hot-spot sequence; analyze hardware metrics relating to execution of the hot-spot sequence; and generate, based on the analyses, a recommendation for the at least one hardware accelerator circuit to improve at least one of power consumption and performance;

wherein the processor, when executing the binary analyzer routine, uses a memory protection mechanism to define protected memory regions in which to store a code segment, a data segment, and a stack segment of the binary analyzer routine; and wherein the processor, when executing the binary analyzer routine determines the hot-spot sequence receives an invariant value in response to multiple memory read requests, is to generate a recommendation that a read stage convert the multiple memory read requests into register read requests, and to store the invariant value in a register.

2. The processor of claim 1, further comprising a hot-spot detector circuit to monitor the execution pipeline, detect the hot-spot sequence, gather the hardware metrics relating to execution of the hot-spot sequence, and generate the hot-spot hardware event.

3. The processor of claim 1, wherein the hot-spot sequence comprises at least one of a branch instruction, a loop instruction, a memory access to at least one of a loop index, a loop constant, and a loop invariant, and an instruction that has repeated at least a threshold number of times.

4. The processor of claim 1, wherein the processor is further to store the recommendation in the data segment for future use, and wherein the recommendation is generated once and used to generate recommendations for future occurrences of the hot-spot sequence.

5. The processor of claim 1, wherein when the processor, during execution of the binary analyzer routine, determines that an instruction source operand value is predictable, the processor is further to generate a recommendation that a register/memory read stage of the execution pipeline use a predicted value for the instruction source operand.

6. The processor of claim 1, wherein the processor, during execution of the binary analyzer routine, is to generate a recommendation to a schedule stage of the execution pipeline to conduct a speculative execution of the hot-spot sequence, and to prepare to roll back the speculative execution.

7. The processor of claim 6, wherein the processor, during execution of the binary analyzer routine, is to generate a recommendation that the schedule stage begin speculative execution at a first linear instruction address, and to stop speculative execution at a second linear instruction access.

8. The processor of claim 1, wherein when the processor, during execution of the binary analyzer routine, identifies underused registers, the processor is further to generate a recommendation to a register allocate stage of the execution pipeline to reallocate the underused registers.

9. The processor of claim 1, wherein when the processor, during execution of the binary analyzer routine, determines that the hot-spot sequence is to utilize less than a threshold amount of power, the processor Is further to generate a recommendation to a power control circuit of the processor to enter into a lower-power power state.

10. A system comprising:
a memory interface to couple to a memory;
at least one hardware accelerator circuit; and
a processing core comprising an execution pipeline comprising at least fetch, decode, and execute stages;
wherein the processing core, in response to a hot-spot hardware event indicating presence of a hot-spot sequence, is to switch context to a binary analyzer routine stored in the memory, the binary analyzer routine comprising instructions that, when fetched, decoded, and executed by the processing core, cause the processing core to analyze a region in the memory containing the hot-spot sequence; analyze hardware metrics relating to execution of the hot-spot sequence; and generate, based on the analyses, a recommendation for the at least one hardware accelerator circuit to improve at least one of power consumption and performance; and wherein the processing core, when executing the binary analyzer routine determines the hot-spot sequence receives an invariant value in response to multiple memory read requests, is to generate a recommendation that a read stage convert the multiple memory read requests into register read requests, and to store the invariant value in a register.

11. The system of claim 10, further comprising a hot-spot detector to monitor the execution pipeline, to detect the hot-spot sequence, to gather the hardware metrics, and to generate the hot-spot hardware event.

12. The system of claim 10, wherein when the processing core, during execution of the binary analyzer routine, determines that an instruction source operand value is predictable, the processing core is further to generate a recommendation that a register/memory read stage of the execution pipeline use a predicted value for the instruction source operand.

13. The system of claim 10, wherein the processing core, during execution of the binary analyzer routine, is to generate a recommendation to a schedule stage of the execution pipeline to conduct a speculative execution of the hot-spot sequence, and to prepare to roll back the speculative execution.

14. The system of claim 10, wherein when the processing core, during execution of the binary analyzer routine, identifies underused registers, the processing core is further to generate a recommendation to a register allocate stage of the execution pipeline to reallocate the underused registers.

15. The system of claim 10, wherein when the processing core, during execution of the binary analyzer routine, determines that the hot-spot sequence is to utilize less than a threshold amount of power, the processing core is further to generate a recommendation to a power control circuit to enter into a lower-power power state.

16. A non-transitory computer-readable storage medium having stored therein instructions, which, when executed by a processor comprising a memory interface to couple to a memory, at least one hardware accelerator circuit, and an execution pipeline comprising at least fetch, decode, and execute stages, cause the processor to:
fetch, decode, and execute instructions; and
switch context, in response to a hot-spot hardware event indicating presence of a hot-spot sequence, to a binary analyzer routine stored in the memory, the binary analyzer routine comprising instructions that, when fetched, decoded, and executed by the processor, cause the processor to analyze a region in the memory containing the hot-spot sequence; analyze hardware metrics relating to execution of the hot-spot sequence; and generate, based on the analyses, a recommendation for the at least one hardware accelerator circuit to improve at least one of power consumption and performance; and wherein the processor, when executing the binary analyzer routine determines the hot-spot sequence receives an invariant value in response to multiple memory read requests, is to generate a recommendation that a read stage convert the multiple memory read requests into register read requests, and to store the invariant value in a register.

17. The non-transitory computer-readable storage medium of claim 16, wherein the processor, during execution of the binary analyzer routine, is further to monitor the execution pipeline, detect the hot-spot sequence, gather the hardware metrics, and generate the hot-spot hardware event.

18. The non-transitory computer-readable storage medium of claim 16, wherein when the processor, during execution of the binary analyzer routine, determines that an instruction source operand value is predictable, the processor is further to generate a recommendation that a register/memory read stage of the execution pipeline use a predicted value for the instruction source operand.

19. The non-transitory computer-readable storage medium of claim 16, wherein the processor, during execution of the binary analyzer routine, is further to generate a recommendation to a scheduling stage of the execution pipeline to conduct a speculative execution of the hot-spot sequence, and to prepare to roll back the speculative execution.

20. The non-transitory computer-readable storage medium of claim 16, wherein when the processor, during execution of the binary analyzer routine, identifies underused registers, the processor is further to generate a recommendation to a register allocation stage of the execution pipeline to reallocate the underused registers.

21. The non-transitory computer-readable storage medium of claim 16, wherein when the processor, during execution of the binary analyzer routine, determines that the hot-spot sequence is utilizing less than a threshold amount of power, the processor is further to generate a recommendation to a power control circuit of the processor to enter into a lower-power power state.

* * * * *